(12) United States Patent
Oumi et al.

(10) Patent No.: US 6,563,782 B1
(45) Date of Patent: May 13, 2003

(54) INFORMATION RECORDING MEDIUM HAVING DOUBLE-LAYER STRUCTURE, AND INFORMATION REPRODUCING APPARATUS AND INFORMATION RECORDING AND REPRODUCING APPARATUS UTILIZING INFORMATION RECORDING MEDIUM HAVING DOUBLE-LAYER STRUCTURE

(75) Inventors: Manabu Oumi, Chiba (JP); Yasuyuki Mitsuoka, Chiba (JP); Norio Chiba, Chiba (JP); Hidetaka Maeda, Chiba (JP); Nobuyuki Kasama, Chiba (JP); Kenji Kato, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/787,155
(22) PCT Filed: Sep. 8, 1999
(86) PCT No.: PCT/JP99/04892
§ 371 (c)(1),
(2), (4) Date: Apr. 19, 2001
(87) PCT Pub. No.: WO00/17868
PCT Pub. Date: Mar. 30, 2000

(30) Foreign Application Priority Data

Sep. 17, 1998 (JP) .......................................... 10-263560
Aug. 27, 1999 (JP) .......................................... 11-241896

(51) Int. Cl.⁷ ................................................ G11B 7/00
(52) U.S. Cl. ...................... 369/126; 369/44.14; 369/283
(58) Field of Search .......................... 369/44.14, 44.15, 369/112.01, 112.23, 120, 121, 118, 126, 44.11, 275.1, 275.3, 275.4, 283, 284, 288

(56) References Cited

U.S. PATENT DOCUMENTS

| | | | | |
|---|---|---|---|---|
| 5,734,632 A | * | 3/1998 | Ito et al. | 369/126 |
| 5,808,973 A | * | 9/1998 | Tanaka | 369/126 |
| 5,936,928 A | * | 8/1999 | Jain et al. | 369/44.14 |
| 6,009,064 A | * | 12/1999 | Hajjar | 369/112.24 |
| 6,055,220 A | * | 4/2000 | Mamin et al. | 369/118 |
| 6,078,468 A | * | 6/2000 | Fiske | 360/97.01 |
| 6,094,413 A | * | 7/2000 | Guerra | 369/275.1 |
| 6,172,945 B1 | * | 1/2001 | Hatam-Tabrizi | 369/116 |

* cited by examiner

Primary Examiner—Paul W. Huber
(74) Attorney, Agent, or Firm—Adams & Wilks

(57) ABSTRACT

An information recording medium comprises a double-layer structure comprised of a light transmitting layer for transmitting light and a light reflecting layer for reflecting light, The light transmitting layer has a data mark which comprises a unit of information to be reproduced.

29 Claims, 15 Drawing Sheets

US 6,563,782 B1

INFORMATION RECORDING MEDIUM HAVING DOUBLE-LAYER STRUCTURE, AND INFORMATION REPRODUCING APPARATUS AND INFORMATION RECORDING AND REPRODUCING APPARATUS UTILIZING INFORMATION RECORDING MEDIUM HAVING DOUBLE-LAYER STRUCTURE

CROSS-REFERENCE TO RELATED APPLICATIONS

This application is a U.S. national state application of copending International Application Ser. No. PCT/JP99/04892, filed Sep. 8, 1999, and claiming a priority date of Sep. 17, 1998, and published in a non-English language.

BACKGROUND OF THE INVENTION

1. Field of the Invention

The present invention relates to a medium for recording information reproducible by utilizing near-field light and an information reproducing apparatus and an information recording and reproducing apparatus for reproducing information recorded in the information recording medium at a high density, particularly to an information recording medium and an information reproducing apparatus capable of providing a reproduced signal having a large intensity and an information recording and reproducing apparatus having high reliability and capable of carrying out high-speed recording.

2. Background Information

A number of present information reproducing apparatus carry out information reproduction on a magnetic disk or an optical disk as an information recording medium. In particular, a CD, which is one of optical disks enabling information recording at a high density and mass production at low cost, is widely utilized as a medium for recording information having a large capacity. The CD is formed with pits having a size of a wavelength of laser beam used in reproduction and a depth of about a quarter of the wavelength on its surface to thereby enable a reading operation utilizing an interference phenomenon of light.

In reading recorded information from an optical disk represented by CD, generally, there is utilized a lens optical system used in an optical microscope. Hence, when information recording density is increased by reducing the size or the track pitch of a pit, due to a problem of a diffraction limit of light, the system runs into a wall that a spot size of laser beam cannot be made a half wavelength or smaller and an information recording unit cannot be constituted by a size smaller than the wavelength of laser beam.

Further, not only in an optical disk but also in a magneto-optical disk recording information by a magneto-optical recording system and a phase change recording system, recording and reproduction of information at a high density is realized by a very small spot of laser beam and therefore, the information recording density is restricted by the diameter of the spot provided by focusing laser beam.

Hence, in order to break though the restriction by the diffraction limit, there has been proposed an information reproducing apparatus using an optical head provided with a very small aperture having a diameter equal to or smaller than the wavelength of laser beam utilized for reproduction, for example, about 1/10 of the wavelength and utilizing near-field light (including both of near-field light and far-field light) generated at the very small aperture portion.

Inherently, there is provided a near-field microscope using a probe having the above-described very small aperture as an apparatus of utilizing near-field light and the near-field microscope is utilized for observation of a very small surface structure of a sample. As one of near-field light utilizing systems in a near-field microscope, there is provided a system (illumination mode) in which a distance between a very small aperture of a probe and a surface of a sample is reduced to a degree of a diameter of the very small aperture of the probe and propagated light is introduced via the probe and toward the very small aperture of the probe, thereby, near-field light is generated at the very small aperture. In this case, scattered light produced by an interaction between the generated near-field light and the surface of the sample, is detected by a scattered light detecting system by being accompanied by intensity or phase reflected with a fine structure of the surf ace of the sample and there is enabled observation having a high resolution which cannot be realized by a conventional optical microscope.

Further, as another system of a near-field microscope utilizing near-field light, there is provided a system in which near-field light is localized at the surface of a sample by irradiating propagated light toward a sample and a very small aperture of a probe is made proximate to the surface of the sample up to a degree of the diameter of the very small aperture of the probe (collection mode). In this case, scattered light produced by interaction between the localized near-field light and the very small aperture of the probe, is introduced to a scattered light detecting system via the very small aperture of the probe by being accompanied by the intensity or phase reflected with a fine structure of the surface of the sample to thereby achieve observation having a high resolution.

Information reproducing apparatus utilizing the above-described near-field light, utilizes these observation systems in the near-field microscope and by utilizing the near-field light, information reproduction of an information recording medium recorded with information at a higher density can be carried out.

In such an information reproducing apparatus, as a probe for reproducing information, there is particularly proposed use of a planer probe without a sharpened front end. FIG. 14 is a view showing a conventional planer probe utilizing near-field light and an information recording medium. In FIG. 14, a planer probe 101 is formed with an aperture having an inverse pyramid structure on a planer substrate and particularly, an apex portion of the aperture is penetrated by a very small aperture 102 having a diameter of several tens nanometers. According to the planer probe 101, near-field light 107 is generated at a vicinity of the very small aperture 102 by irradiating laser beam 106 toward the very small aperture 102.

The near-field light 107 is scattered by a data mark 105 particularly showing strong interaction between the near-field light and the data mark and produces propagated light 108 at an information recording medium 104. The propagated light 108 is introduced to a light receiving element 103 provided at a vicinity of the very small aperture 102 of the planer probe 101 and is detected as a reproduced signal.

As described above, the planer probe is constructed by a constitution in which both of the very small aperture 102 for generating the near-field light 107 and the light receiving element 103 for detecting the propagated light 108 scattered from the data mark 105, are arranged on a side of a surface of the information recording medium 104 (reflection mode) and therefore, downsizing of an information reproducing apparatus can be achieved, further, the planer probe can be formed by using the semiconductor fabrication technology and accordingly, mass production having high reproducibility is realized and the planer probe is pertinently used as an optical head of the information reproducing apparatus utilizing the near-field light.

Further, high density information recording can be carried out also by changing a state, for example, a crystal state of the surface of the information recording medium by interaction between the near-field light generated from the probe and the information recording medium.

However, in using the planer probe 101, in order to provide the propagated light 108 scattered from the data mark 105, since the propagated light 108 is defined as light having a wavelength of several 100 nm, it is necessary to make a distance "a" from the data mark 105 or the very small aperture 106 to the light receiving element 103 equal to or larger than the wavelength. In this case, a clearance "d" between the very small aperture 102 and the information recording medium 104 is generally provided with a value equal to or smaller than 100 nm in order to achieve sufficiently large interaction between the near-field light 107 generated at the very small aperture 102 and the data mark 105 on the information recording medium 104. Therefore, in the clearance "d", the propagated light 108 is detected only at a location separated from the data mark 105 by at least several 100 nm or more in a direction in parallel with the surface of the information recording medium 104.

Generally, since the near-field light 107 is introduced from right above the data mark 105, an essential intensity distribution of the propagated light 108 produced by being scattered by the data mark 105, indicates a small value with respect to a component of the propagated light in the direction in parallel with the surface of the information recording medium 104. Further, since the clearance "d" is provided with a sufficiently small value, a light amount of the propagated light 108 cannot be provided sufficiently.

Further, as an information reproducing apparatus, there can be selected a constitution in which the substrate of the information recording medium 104 is formed by a light transmitting member and the propagated light 108 scattered from the data mark 105 is detected at a rear face of the information recording medium 104 (transmission mode), however, it is necessary to install a light receiving element on the rear face side of the information recording medium 104, which results in large-sized formation of the apparatus.

Further, recording can be carried out also by generating near-field light by using the above-described planer type near-field optical head and by changing, for example, a crystal state of a surface of an information recording medium as an information recording apparatus. In this case, it is necessary to provide some assisting energy to the surface of the information recording medium since the intensity of the near-field light is very low. This is referred to as assist light. The assist light is irradiated to the data mark by propagating the assist light in a direction right reverse to that of the propagated light 108 in FIG. 14, which provides energy at a level which is slightly smaller than the threshold of energy necessary for changing the state of the surface of the information recording medium. By adding energy of the near-field light irradiated from the near-filed optical head to the energy of the assist light, there is provided the energy exceeding the above-described threshold and the state of the surface of the information recording medium is changed, which constitutes recording of information.

In order to carry out information recording by such a method, it is necessary to irradiate assist light to the data mark stably with sufficient intensity, however, similar to the propagated light in the information reproducing apparatus, there poses a problem that a space for propagating the assist light is insufficient. That is, it is necessary to make the near-field optical head and the surface of the information recording medium proximate to each other such that the both can carry out interaction by the near-field light and it is difficult that the assist light which is propagated light invades the small clearance. Therefore, the assist light having sufficient intensity cannot reach the data mark and the data mark cannot be provided with energy necessary for recording even by adding the near-field light from the near-field optical head.

In view of the above-described problems, it is an object of the invention to provide an information recording medium capable of providing a reproduced signal having a sufficiently large intensity of information recorded at a high density, an information reproducing apparatus achieving downsized formation by the information recording medium and an information recording and reproducing apparatus having high speed and high reliability.

SUMMARY OF THE INVENTION

In order to achieve the above-described object, a first information recording medium according to the invention is characterized in that in an information recording medium formed with information reproduced by a reproducing probe provided with a very small aperture for generating near-field light on a surface of the medium wherein the information recording medium comprises a two layer structure of a light transmitting layer for transmitting light and a light reflecting layer for reflecting light and a data mark constituting a unit of the information is formed on the light transmitting layer.

According to the invention, the first information recording medium comprises the two layer structure of the light transmitting layer comprising the light transmitting member and the light reflecting layer comprising the light reflecting member and the data mark is formed above the light reflecting layer and accordingly, the propagated light generated by the interaction between the near-field light and the data mark can be reflected by the light reflecting layer via the light transmitting layer and can be emitted from the surface of the information recording medium and a sufficiently large amount of the propagated light can be provided at the surface of the information recording medium at a position remote from the data mark.

Further, a second information recording medium according to the invention in accordance with the first information recording medium according to the invention is characterized in that an interface between the light transmitting layer and the light reflecting layer is inclined in one direction.

According to the invention, the second information recording medium comprises the two layer structure of the light transmitting layer comprising the light transmitting member and the light reflecting layer comprising the light reflecting member, the interface between the light transmitting layer and the light reflecting layer is inclined in one direction, the data mark is formed on the light transmitting layer and accordingly, the propagated light generated by the interaction between the near-field light and the data mark can be strongly reflected in the one direction at the light reflecting layer via the light transmitting layer and can be emitted from the surface of the light recording medium and a sufficient amount of the propagated light can be provided at the surface of the information recording medium at a position remote from the data mark on the side of the inclined face of the light reflecting layer 1.

Further, a third information recording medium according to the invention in accordance with the first information recording medium according to the invention is characterized in that a surface of the light reflecting layer constituting an interface between the light transmitting layer and the light reflecting layer, is formed in a shape of reflecting light incident on the light reflecting layer to a specific area.

According to the invention, the third information recording medium comprises the two layer structure of the light transmitting layer comprising the light transmitting member and the light reflecting layer comprising the light reflecting member, the surface of light reflecting layer is formed in the shape achieving reflection of light to the specific area, the data mark 4 is formed on the light transmitting layer and accordingly, the propagated light generated by the interaction between the near-field light and the data mark, can pass the light transmitting layer, can be strongly reflected to the specific area at the light reflecting layer, can be emitted from the surface of the information recording medium and a sufficient amount of the propagated light can be provided at the specific area at a position remote from the data mark.

Further, a fourth information recording medium according to the invention in accordance with the third information recording apparatus according to the invention is characterized in that the shape constitutes a diffraction grating.

According to the invention, the fourth information recording medium comprises the two layer structure of the light transmitting layer comprising the light transmitting member and the light reflecting layer comprising the light reflecting member, the diffraction grating is formed at the surface of the light reflecting layer, the data mark is formed on the light transmitting layer and accordingly, the propagated light generated by the interaction of the near-field light and the data mark can pass through the light transmitting layer, can be strongly reflected to the specific area determined by the diffraction grating at the light reflecting layer and can be emitted from the surface of the information recording medium and a sufficient amount of the propagated light can be provided at the specific area at a position remote from the data mark.

Further, a first information reproducing apparatus according to the invention is characterized in that in an information reproducing apparatus for reproducing information by a reproducing probe provided with a very small aperture for generating near-field light, the information reproducing apparatus comprising an information recording medium comprising a two layer structure of a light transmitting layer for transmitting light and a light reflecting layer for reflecting light and formed with a data mark constituting a unit of the information on the light transmitting layer, and light detecting means for detecting propagated light generated by an interaction between the near-field light and the data mark and outputting a detected signal.

According to the invention, there is used the information recording medium comprising the two layer structure of the light transmitting layer comprising the light transmitting member and the light reflecting layer comprising the light reflecting member and formed with the data mark on the light reflecting layer, the propagated light provided by the information recording medium is received by the light detecting means, a reproduced signal having sufficiently large intensity indicating presence or absence of the data mark can be provided and accordingly, there can be realized downsized formation of the apparatus in the case of adopting the illumination mode and a transmission mode constituting a system of information reproduction utilizing near-field light and there can be reproduced stable information having high reliability by the reproduced signal having the sufficiently large intensity.

Further, a second information reproducing apparatus according to the invention is characterized in that in an information reproducing apparatus for reproducing information by a reproducing probe provided with a very small aperture for guiding out propagated light by an interaction with near-field light, the information reproducing apparatus comprising an information recording medium comprising a two layer structure of a light transmitting layer for transmitting light and a light reflecting layer for reflecting light and formed with a data mark constituting a unit of the information on the light transmitting layer, and light irradiating means for irradiating irradiation light for generating the near-field light at the data mark to the information recording medium.

According to the invention, there is used the information recording medium comprising the two layer structure of the light transmitting layer comprising the light transmitting member and the light reflecting layer comprising the light reflecting member and formed with the data mark above the light reflecting layer, the propagated light provided by the information recording medium is received by the light detecting means, a reproduced signal having a sufficiently large intensity indicating presence or absence of the data mark can be provided and accordingly, there can be realized downsized formation of the apparatus in the case of adopting the collection mode and the transmission mode constituting the system of information reproduction utilizing near-field light and there can be reproduced stable information having high reliability by the reproduced signal having the sufficiently large intensity.

Further, a third information reproducing apparatus according to the invention is characterized in that in an information reproducing apparatus for reproducing information by a reproducing probe provided with a very small aperture for generating near-field light, the information reproducing apparatus comprising an information recording medium comprising a two layer structure of a light transmitting layer for transmitting light and a light reflecting layer for reflecting light and formed with a data mark constituting a unit of the information on the light transmitting layer, first and second light detecting means for outputting detected signals by detecting propagated light generated by an interaction between the near-field light and the data mark and arranged on left and right sides of the very small aperture, difference calculating means for calculating a difference between a first detected signal outputted from the first light detecting means and a second detected signal outputted from the second light detecting means and outputting a difference signal, reproducing probe position controlling means for controlling a position of the reproducing probe in accordance with the difference signal, and reproduced signal generating means for generating a reproduced signal by calculating to add the first detected signal and the second detected signal.

According to the invention, there is used the information recording medium comprising the two layer structure of the light transmitting layer comprising the light transmitting member and the light reflecting layer comprising the light reflecting member and formed with the data mark above the light reflecting layer, the propagated light provided by the information recording medium can be detected in two direction relative to the very small aperture of the reproducing probe and there can be carried out tracking control of the reproducing probe by the difference between the detected two detected signals. Further, the near-field light generated at the very small aperture of the reproducing probe is utilized as a signal for tracking control and therefore, there can be carried out the tracking control having high accuracy with high positional resolution.

Further, a fourth information reproducing apparatus according to the invention in accordance with any one of the first through the third information reproducing apparatus according to the invention, is characterized in that the reproducing probe is a planer probe comprising a planer substrate formed with a hole in a shape of an inverse cone penetrated such that a top portion thereof constitutes the very small aperture and arranged with the light detecting means or the light irradiating means at the planer substrate.

According to the invention, as the reproducing probe, there is adopted the planer probe provided with the light detecting means or the light irradiating means and accordingly, further compact apparatus constitution is achieved. Further, the planer probe can be fabricated by using the semiconductor fabrication technology and accordingly, mass production having high reproducibility can be carried out.

Further, a fifth information reproducing apparatus according to the invention in accordance with the fourth information reproducing apparatus according to the invention, is characterized in that the reproducing probe carries out reproduction by a state of being inclined relative to a surface of the information recording medium.

According to the invention, the propagated light provided by the information recording medium comprising the two layer structure of the light transmitting layer and the light reflecting layer, is received by the light detecting means of the planer probe arranged to incline such that the clearance between the planer probe and the surface of the information recording medium becomes sufficiently large, there can be provided the reproduced signal having sufficiently large intensity indicating presence or absence of the data mark and accordingly, there is realized downsized formation of the apparatus in the case of adopting the transmission mode constituting one of the system of information reproduction utilizing near-field light, further, there can be reproduced stable information having high reliability by the reproduce signal having the sufficiently large intensity.

Further, a sixth information reproducing apparatus according to the invention in accordance with any one of the first through the third information reproducing apparatus according to the invention, is characterized in that the reproducing probe comprises an optical fiber a front end of which is provided with the very small aperture.

According to the invention, there can be utilized the probe of the optical fiber type used in a conventional near-field microscope as the reproducing probe and accordingly, accumulated technology of the near-field microscope is effectively applicable to the information reproducing apparatus.

Further, a seventh information reproducing apparatus according to the invention in accordance with any one of the first through the third information reproducing apparatus according to the invention, is characterized in that the reproducing probe is a probe of a cantilever type provided with the very small aperture at a projected portion thereof.

According to the invention, there can be utilized the probe of the cantilever type used in a conventional near-field microscope as the reproducing probe and accordingly, accumulated technology of the near-field microscope is effectively applicable to the information reproducing apparatus.

Further, a first information recording and reproducing apparatus according to the invention is characterized in that in an information recording and reproducing apparatus in which a recording and reproducing probe provided with a very small aperture for generating near-field light records and reproduces information to and from an information recording medium by carrying out an interaction between the recording and reproducing probe and the information recording medium via the near-field light wherein the information recording medium comprises a two layer structure of a light transmitting layer for transmitting light and a light reflecting layer for reflecting light and formed with a data mark constituting a unit of the information on the light transmitting layer, the information recording and reproducing apparatus comprising near-field light generating light irradiating means for irradiating irradiation light for generating the near-field light to the recording and reproducing probe, and propagated light irradiating means for irradiating light to the light reflecting layer such that the light is irradiated to an area at which the near-field light on the light transmitting layer carries out the interaction.

According to the invention, the first information recording and reproducing apparatus comprises the light transmitting layer comprising the light transmitting member and the light reflecting layer comprising the light reflecting member and formed with the data mark above the light reflecting layer and accordingly, the data mark can be irradiated not only by the near-field light from the probe but by the light from the light reflecting layer and larger energy can be provided by the data mark.

Further, according to a second information recording and reproducing apparatus according to the invention in accordance with the first information recording and reproducing apparatus according to the invention, is characterized in that the light irradiated to the light reflecting layer is provided with an intensity and a wavelength for assisting the near-field light for recording the information.

According to the invention, energy necessary for information recording can be provided not only by the near-field light from the probe but also from assist light from the light reflecting layer and by changing a state of the surface of the information recording medium by controlling very weak near-field light, recording having high reliability can be carried out at high speed.

DETAILED DESCRIPTION OF THE PREFERRED EMBODIMENTS

A detailed explanation will be given of embodiments of an information recording medium, an information reproducing apparatus and an information recording and reproducing apparatus in reference to the drawings as follows.
(Embodiment 1)

Figure 1:
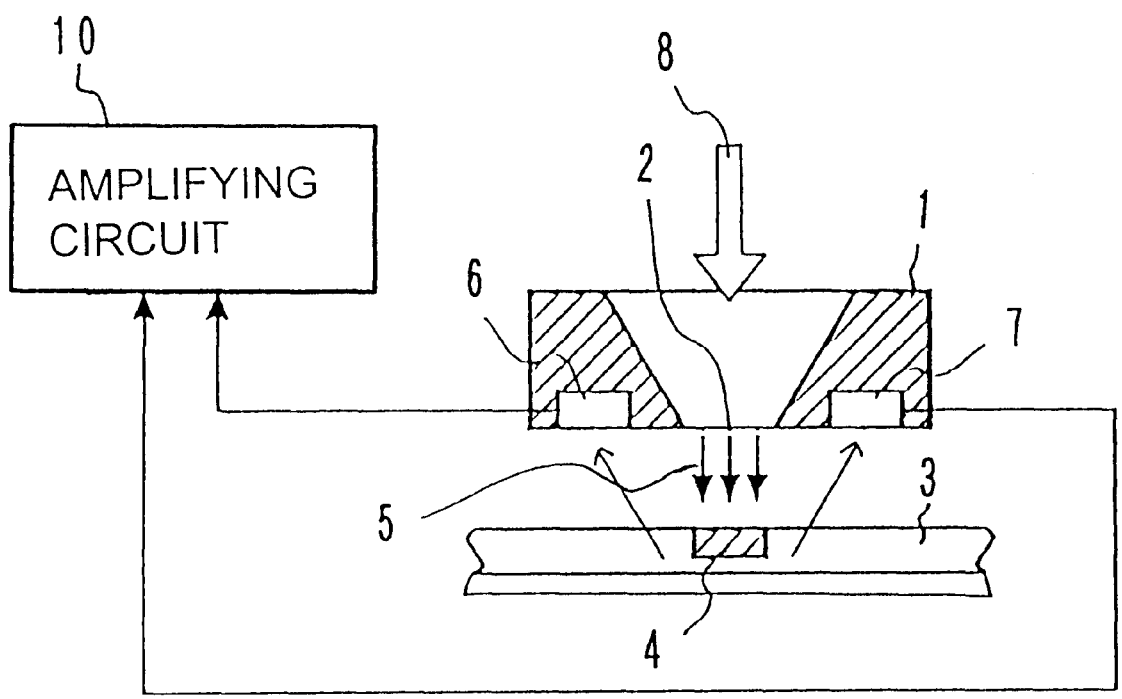
FIG. 1 is a block diagram showing an outline constitution of an information reproducing apparatus according to Embodiment 1 of the invention.

FIG. 1 is a block diagram showing an outline constitution of an information reproducing apparatus according to Embodiment 1 of the invention. In FIG. 1, the information reproducing apparatus according to Embodiment 1 is provided with a planer probe 1 for generating near-field light, an information recording medium 3 formed with a data mark 4 at a high density, light receiving element 6 and 7 for receiving propagated light scattered by the data mark 4 and outputting electric signals and an adding circuit 10 for carrying out adding operation by amplifying the respective electric signals outputted from the light receiving elements 6 and 7 and outputting a reproduced signal.

Figure 2:
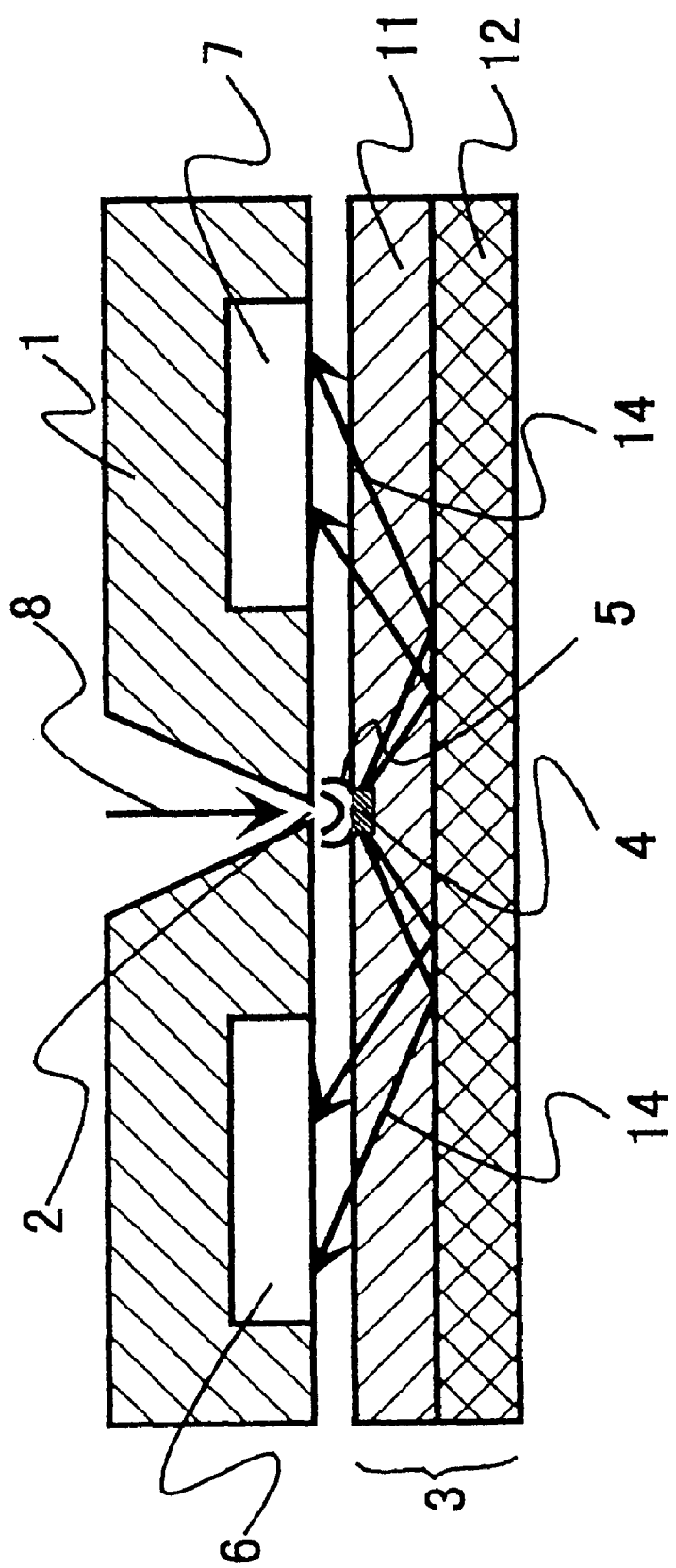
FIG. 2 is a view for explaining in details, a planer probe and an information recording medium of the information reproducing apparatus according to Embodiment 1 of the invention.

FIG. 2 is a view for explaining in details, the planer probe 1 and the information recording medium 3. In FIG. 2, the planer probe 1 is formed with a very small aperture 2 having a size equal to or smaller than a wavelength of laser beam 8 introduced from a laser beam source (not illustrated), for example, a diameter of several tens nanometers for generating near-field light 5 at the very small aperture 2 by introducing the laser beam 8.

The near-field light 5 generated at the very small aperture 2 of the planer probe 1, is scattered by a record mark 4 formed at the information recording medium 3 and the scattered light constitutes propagated light 14 which is incident on the light receiving elements 6 and 7. In this case, the planer probe 1 as shown by FIG. 2 is formed by a silicon process used in the conventional semiconductor fabrication technology and the light receiving elements 6 and 7 comprise photodiodes integrated on a silicon wafer. Further, although in FIG. 2, in order to receive a sufficient amount of the propagated light 14, the two light receiving elements 6 and 7 are provided at vicinities of the very small aperture 2 and symmetrically relative to the very small aperture 2, there may be constituted either one of the light receiving elements.

Further, the information recording medium 3 is constructed by a two layer structure of a light transmitting layer 11 comprising a light transmitting member and a light reflecting member 12 comprising a light reflecting member and the data mark 4 is formed on the light transmitting layer 11.

Therefore, most of the propagated light 14 provided by interaction between the near-field light 5 generated at the very small aperture 2 and the data mark 4, reaches a lower layer of the light reflecting layer 12 by passing through the light transmitting layer 11. That is, in the light transmitting layer 11, scattering of the near-field light by the above-described transmission mode is achieved. The propagated light 14 which has reached the light reflecting layer 12, is reflected by a surface of the light reflecting layer 12, specifically, an interface between the light transmitting layer 11 and the light reflecting layer 12, passes through the light transmitting layer 11 again and is emitted from the surface of the information recording medium 3.

Thereby, the propagated light 14 scattered at the data mark 4, follows an optical path having a distance at least twice as much as a thickness of the light transmitting layer 11 and by sufficiently thickening the thickness of the light transmitting layer 11, an amount of the propagated light 14 emitted from the surface of the information recording medium 3 can be increased. That is, an amount of the propagated light 14 which can be received by the light receiving elements 6 and 7 is also increased and a reproduced signal having large intensity can be provided.

As has been explained, according to the information recording medium according to Embodiment 1, the information recording medium is constructed by the two layer structure of the light transmitting layer 1 comprising a light transmitting member and the light reflecting layer 12 comprising a light reflecting member, the data mark 4 is formed above the light reflecting layer 12 and therefore, the propagated light 14 scattered at the data mark 4 can be reflected by the light reflecting layer 12 via the light transmitting layer 11 and can be emitted from the surface of the information recording medium 3 and a sufficiently large amount of the propagated light 14 can be provided at a position remote from the data mark 4 and above the information recording medium 3. Further, according to the information reproducing apparatus according to Embodiment 1, the propagated light 14 provided by the above-described information recording medium 3 can be received by the light receiving elements 6 and 7 of the planer probe 1, the reproduced signal having a sufficiently large intensity indicating presence or absence of the data mark 4 can be provided and therefore, the downsized formation of the apparatus in the case of adopting the above-described transmission mode can be achieved, further, there can be reproduced stable information having high reliability by the reproduced signal having sufficiently large intensity.

(Embodiment 2)

Next, an explanation will be given of an information recording medium and an information reproducing apparatus according to Embodiment 2. The information reproducing apparatus according to Embodiment 2 differs from the information reproducing apparatus according to Embodiment 1 in a constitution of a planer probe and a constitution of an information recording medium. Other apparatus constitution is similar to that in FIG. 1 and accordingly, an explanation thereof will be omitted here.

Figure 3:
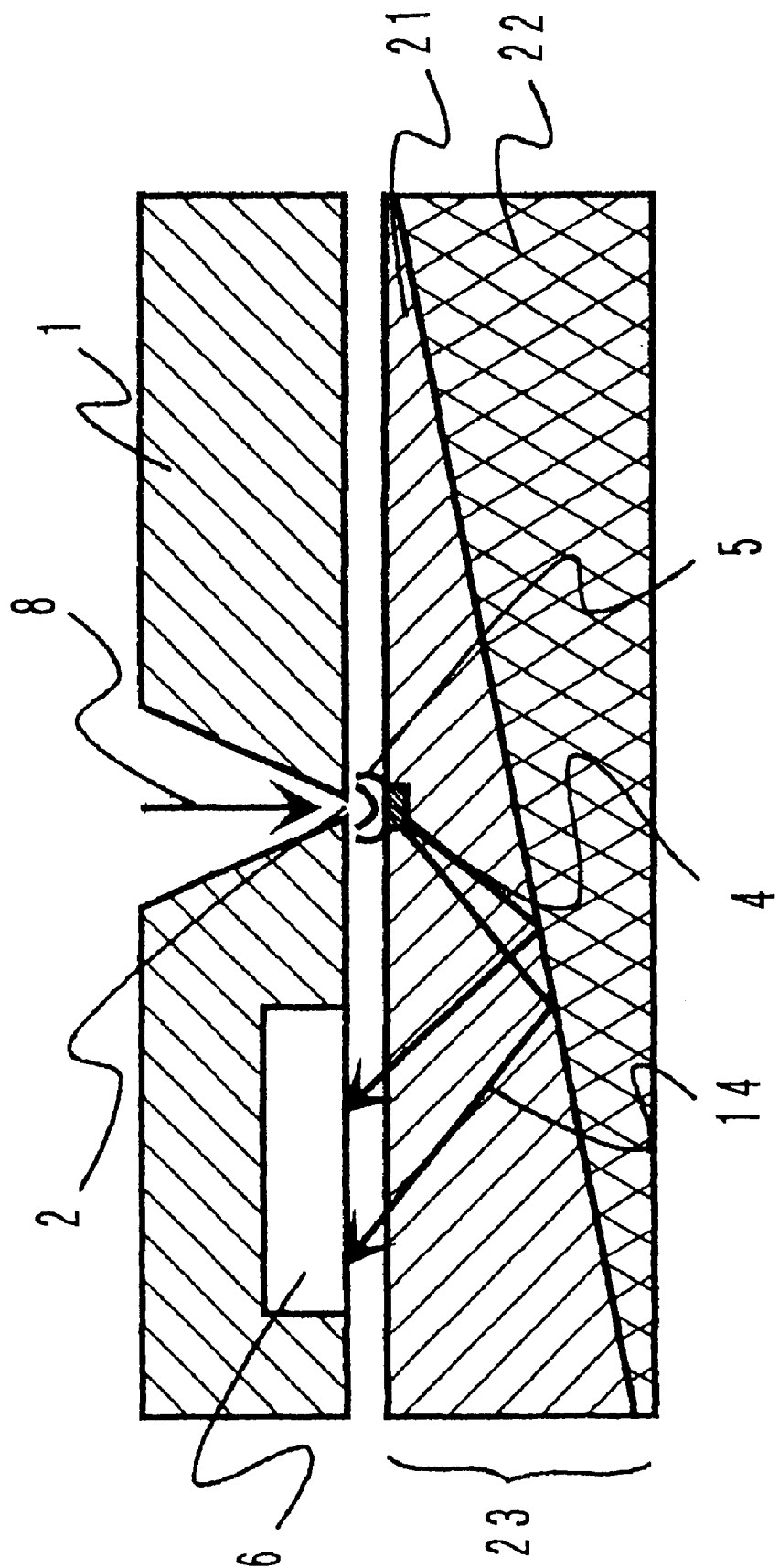
FIG. 3 is a view for explaining in details, a planer probe and an information recording medium of an information reproducing apparatus according to Embodiment 2 of the invention.

FIG. 3 is a view for explaining in details, the planer probe 1 and an information recording medium 23 of the information reproducing apparatus according to Embodiment 2. In FIG. 3, the planer probe 1 differs from the planer probe according to Embodiment 1 in providing only the light receiving element 6 for receiving the propagated light 14.

Further, although the information recording medium 23 is constructed by a two layer structure of a light transmitting layer 21 comprising a light transmitting member and a light reflecting layer 22 comprising a light reflecting member, as shown by FIG. 3, an interface between the light transmitting layer 21 and the light reflecting layer 22, is inclined in one direction orthogonal to a reading direction (or scanning direction) of the planer probe 1 and in parallel with the surface of the information recording medium 3.

Therefore, most of the propagated light 14 provided by the interaction between the near-field light 5 generated at the very small aperture 2 and the data mark 4 passes through the light transmitting layer 21 and reaches a lower layer of the light reflecting layer 22. That is, in the light transmitting layer 21, scattering of the near-field light by the above-described transmission mode is achieved. Further, the propagated light 14 which has reached the light reflecting layer 22 is strongly reflected in the direction of the inclined face of the light reflecting layer 22 at the surface of the light reflecting layer 22, specifically, the interface between the light transmitting layer 21 and the light reflecting layer 22 passes through the light transmitting layer 21 again and is emitted from the surface of the information recording medium 23. That is, most of the propagated light 14 is emitted from the surface of the information recording medium 23 on the side of the inclined face of the light reflecting layer 22 relative to the data mark 4.

Thereby, the propagated light 14 scattered by the data mark 4 follows an optical path having a distance at least twice as much as a thickness of the light transmitting layer 21 right below the data mark 4 and by sufficiently thickening the thickness of the light transmitting layer 21, an amount of the propagated light 14 emitted from the surface of the information recording medium 23 can be increased. Further, since the interface between the light transmitting layer 21 and the light reflecting layer 22, specifically, the surface of the light reflecting layer 22 is inclined, the direction of reflecting the propagated the light 14 can be determined. That is, the light receiving element 6 of the planer probe 1 is arranged on the side of the inclined face of the light reflecting layer 22 relative to the very small aperture 2 and receives a sufficient amount of the propagated light 14 and a reproduced signal having large intensity can be provided.

As has been explained above, according to the information recording medium according to Embodiment 2, the information recording medium is constructed by the two layer structure of the light transmitting layer 21 comprising a light transmitting member and the light reflecting layer 22 comprising a light reflecting member. Furthermore, the interface between the light transmitting layer 21 and the light reflecting layer 22 is inclined in one direction, the data mark 4 is formed on the light transmitting layer 21 and accordingly, the propagated light 14 scattered at the data mark 4 can pass through the light transmitting layer 21, can be strongly reflected in one direction at the light reflecting layer 22 and can be emitted from the surface of the information recording medium 23. Thereby, a sufficiently large amount of the propagated light 14 can be provided at a position remote from the data mark 4 to the side of the inclined face of the light reflecting layer 22 and at the surface of the information recording medium 23. Further, according to the information reproducing apparatus according to Embodiment 2, the propagated light 14 provided by the above-described information recording medium 23 is received at the light receiving element 6 of the planer probe 1, and a reproduced signal having sufficiently large intensity indicating presence or absence of the data mark 4 can be provided. Accordingly, downsized formation of the apparatus in the case of adopting the above-described transmission mode can be utilized. Furthermore, stable information having high reliability by the reproduced signal having the sufficiently large intensity can be reproduced.

(Embodiment 3)

Next, an explanation will be given of an information recording medium and an information reproducing apparatus according to Embodiment 3. The information reproducing apparatus according to claim 3 differs from the information reproducing apparatus according to claim 1 only in a constitution of an information recording medium. Other apparatus constitution is similar to that in FIG. 1 and accordingly, an explanation thereof will be omitted here.

Figure 4:
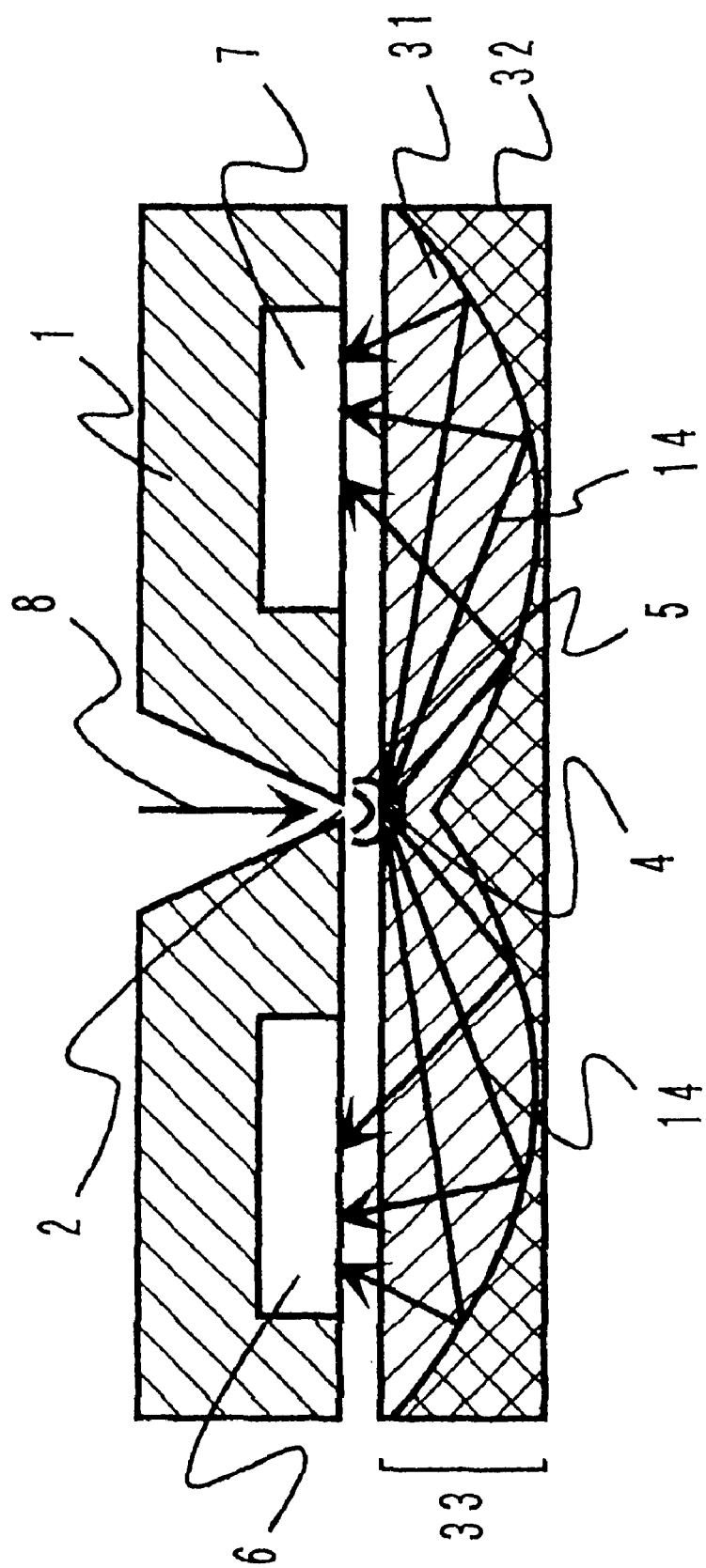
FIG. 4 is a view for explaining in details, a planer probe and an information recording medium of an information reproducing apparatus according to Embodiment 3 of the invention.

FIG. 4 is a view for explaining in details, the planer probe 1 and an information recording medium 33. In FIG. 4, the information recording medium 33 is constructed by a two layer structure of a light transmitting layer 31 comprising a light transmitting member and a light reflecting member 32 comprising a light reflecting member, particularly, an interface between the light transmitting layer 31 and the light reflecting layer 32, specifically, the surface of the light reflecting layer 32, is formed by two recess portions constituting left and right symmetry relative to an axis passing through the data mark 4 and along a reading direction (or scanning direction) of the planer probe 1.

Further, each of the recess portions is constituted by a shape in which the propagated light 14 scattered from the data mark 4 and passing through the light transmitting layer 31, is reflected toward a certain specific area on the information recording medium 33 disposed right above the recess portion.

Therefore, most of the propagated light 14 provided by interaction between the near-field light 5 generated at the very small aperture 2 and the data mark 4, passes through the light transmitting layer 31 and reaches a lower layer of the light reflecting layer 32, reflected toward the above-described specific areas at the respective recess portions of the light reflecting layer 32 and emitted from the surface of the information recording medium 33.

Thereby, the propagated light 14 scattered from the data mark 4 follows an optical path having a distance at least twice as much as a thickness of the light transmitting layer 31 right below the data mark 4, and by sufficiently thickening a thickness of the light transmitting layer 31, an amount of the propagated light 14 emitted from the surface of the information recording medium 33 can be increased. Further, the interface between the light transmitting layer 31 and the light reflecting layer 32, specifically, the surface of the light reflecting layer 32, is formed by the two recess portions and, accordingly, directions of reflecting the propagated light 14 can be determined by the respective recess portions. That is, the light receiving elements 6 and 7 of the planer probe 1 are arranged to be disposed at the above-described specific areas determined by the respective recess portions in a state of being proximate to the surface of the information recording medium 33 and receive a sufficient amount of the propagated light 14 and can output a reproduced signal having large intensity.

As has been explained above, according to the information recording medium according to Embodiment 3, the information recording medium is constructed by the two layer structure of the light transmitting layer 31 comprising a light transmitting member and the light reflecting member 32 comprising a light reflecting member, further, the surface of the light reflecting member 32 is formed by the two recess portions, the data mark 4 is formed on the light transmitting layer 31 and accordingly, the propagated light 14 scattered at the data mark 4 can strongly be reflected toward the specific areas determined by the respective specific portions in the light reflecting layer 32 via the light transmitting layer 31 and can be emitted from the surface of the information recording medium 33. Thereby, a sufficiently large amount of the propagated light 14 can be provided at the surface of the information recording medium 33 at distances from the data mark 4. Further, according to the information reproducing apparatus according to Embodiment 3, the propagated light 14 provided by the above-described information recording medium 33 is received by the light receiving elements 6 and 7 of the planer probe 1, a reproduced signal having sufficiently large intensity indicating presence or absence of the data mark 4 can be provided and accordingly, downsized formation of the apparatus in the case of adopting the above-described transmission mode can be used, further stable information having high reliability by the reproduced signal having the sufficiently large intensity can be reproduced.

(Embodiment 4)

Next, an explanation will be given of an information recording medium and an information reproducing apparatus according to Embodiment 4. The information reproducing apparatus according to Embodiment 4 differs from the information reproducing apparatus according to Embodiment 1 only in a constitution of an information recording medium. Other apparatus constitution is similar to that in FIG. 1 and accordingly, an explanation thereof will be omitted here.

Figure 5:
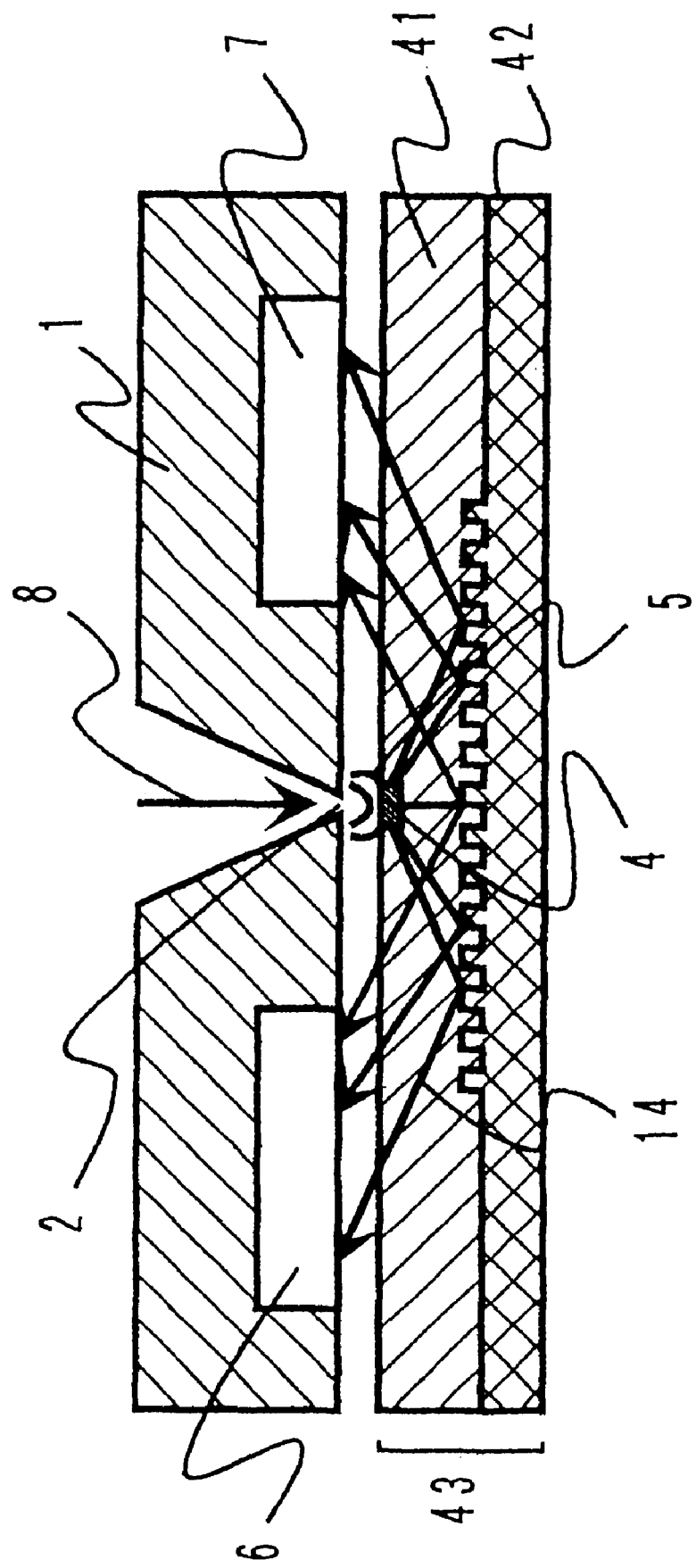
FIG. 5 is a view for explaining in details, a planer probe and an information recording medium of an information reproducing apparatus according to Embodiment 4 of the invention.

FIG. 5 is a view for explaining in details, the planer probe 1 and an information recording medium 43 of the information reproducing apparatus according to Embodiment 4. In FIG. 5, the information recording medium 43 is constructed by a two layer structure of a light transmitting layer 41 comprising a light transmitting member and a light reflecting layer 42 comprising light reflecting member, particularly, a diffraction grating is formed at an interface between the light transmitting layer 41 and the light reflecting layer 42, specifically, the surface of the light reflecting layer 42.

The diffraction grating on the surface of the light reflecting layer 42 is formed such that the propagated light 14 scattered by the data mark 4 and passing through the light transmitting layer 41, is reflected toward certain specific areas above the information recording medium 43. For example, as shown by FIG. 5, the specific areas are two areas constituting left and right symmetry relative to an axis passing through the data mark 4 and along a reading direction (or scanning direction) of the planer probe 1 above the information recording medium 43.

Therefore, most of the propagated light 14 provided by interaction between the near-field light 5 generated at the very small aperture 2 and the data mark 4, passes through the light transmitting layer 41 and reaches a lower layer of the light reflecting layer 42, is strongly reflected toward the above-described specific areas at the diffraction grating of the light reflecting layer 42 and is emitted from the surface from the information recording medium 43.

Thereby, the propagated light 14 scattered from the data mark 4, follows an optical path having a distance at least twice as much as a thickness of the light transmitting layer 41 right below the data mark 4 and by sufficiently thickening the thickness of the light transmitting layer 41, an amount of the propagated light 14 emitted from the surface of the information recording medium 43 can be increased. Further, since the diffraction grating is formed at the surface of the light reflecting layer 42, the direction of reflecting the propagated light 14 can be determined with high accuracy by the diffraction grating. That is, the light receiving elements 6 and 7 of the planer probe 1 are arranged to dispose at the above-described specific areas determined by the diffraction grating in a state in which the planer probe 1 is proximate to the surface of the information recording medium 43 and receives a sufficiently large amount of the propagated light 14 and a reproduced signal having large intensity can be provided.

As has been explained above, according to the information recording medium according to Embodiment 4, the information recording medium is constructed by the two layer structure of the light transmitting layer 41 comprising a light transmitting member and the light reflecting layer 42 comprising a light reflecting member, the diffraction grating is formed at the surface of the light reflecting layer 42, the data mark 4 is formed on the light transmitting layer 41 and accordingly, the propagated light 14 scattered at the data mark 4, can strongly be reflected toward the specific areas determined by the diffraction grating at the light reflecting layer 42 via the light transmitting layer 41 and can be emitted from the surface of the information recording medium 43. Thereby, a sufficiently large amount of the propagated light 14 can be provided at positions remote from the data mark 4 and above the information recording medium 43. Further, according to the information reproducing apparatus according to Embodiment 4, the propagated light 14 provided by the above-described information recording medium 43, is received by the light receiving elements 6 and 7 of the planer probe 1, the reproduced signal having sufficiently large intensity indicating presence or absence of the data mark 4 can be provided and accordingly, downsized formation of the apparatus in the case of adopting the above-described transmission mode can be utilized, further, stable information having high reliability by the reproduced signal having the sufficiently large intensity can be reproduced.

(Embodiment 5)

Next, an explanation will be given of an information recording medium and an information reproducing apparatus according to Embodiment 5. The information reproducing apparatus according to Embodiment 5 differs from the information reproducing apparatus according to Embodiment 1 in the constitution of the planer probe and arrangement thereof with respect to the information recording medium. Other apparatus constitution is similar to that in FIG. 1 and accordingly, an explanation thereof will be omitted here.

Figure 6:
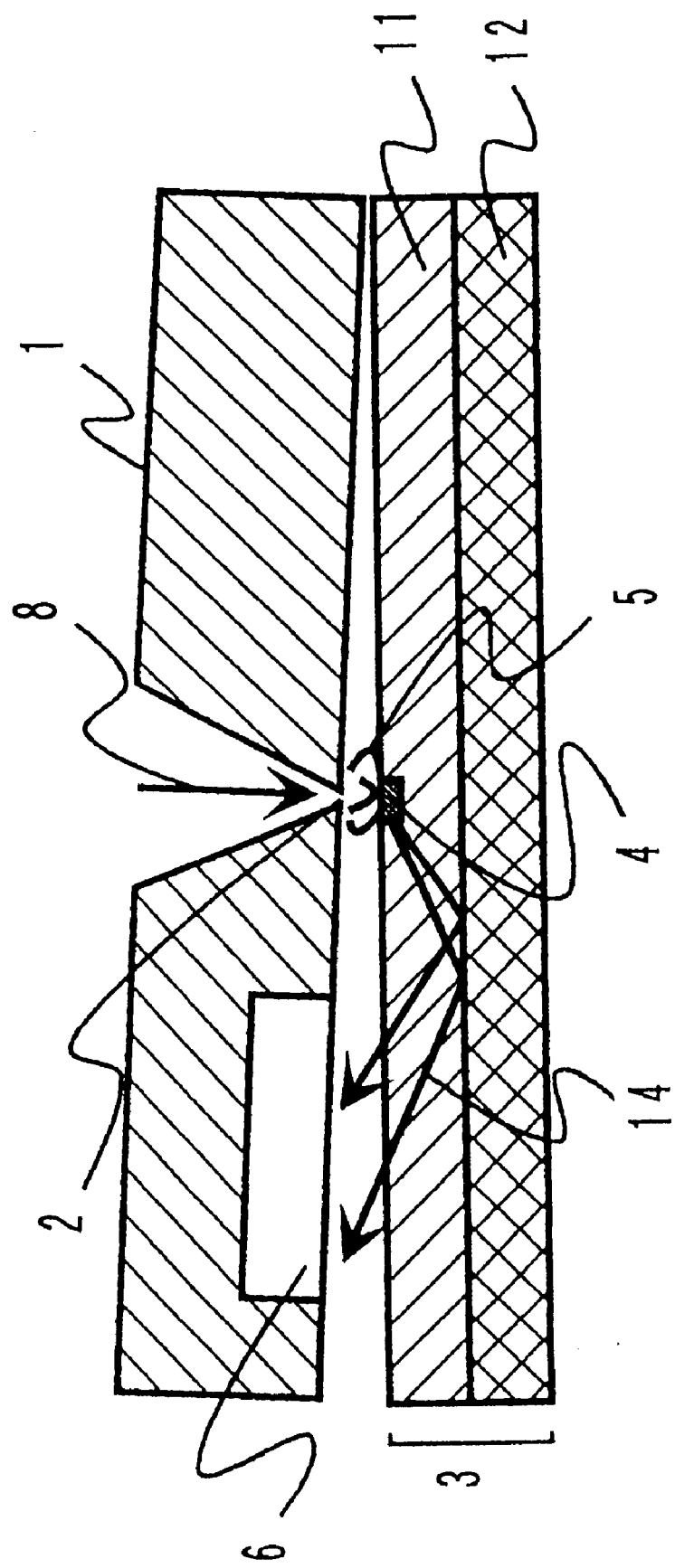
FIG. 6 is a view for explaining in details, a planer probe and an information recording medium of an information reproducing apparatus according to Embodiment 5 of the invention.

FIG. 6 is a view for explaining in details, the planer probe 1 and the information recording medium 3 of the information reproducing apparatus according to Embodiment 5. In FIG. 6, the planer probe 1 differs from the planer probe according to Embodiment 1 in that only the light receiving element 6 is provided for receiving the propagated light 14. Further, the information recording medium 3 is the same as the information recording medium explained in Embodiment 1.

A significant characteristic of the information reproducing apparatus according to Embodiment 5 resides in that as shown by FIG. 6, the planer probe 1 is used to incline relative to the surface of the information recording medium 3. Particularly, the planer probe 1 is inclined such that a distance thereof from the surface of the information recording medium 3 becomes larger on a side thereof arranged with the light receiving element 6 than a side thereof which is not arranged with the light receiving element 6.

Therefore, most of the propagated light 14 provided by the interaction between the near-field light 5 generated at the very small aperture 2 and the data mark 4, passes through the light transmitting layer 11, reaches the light reflecting layer 12 at the lower layer, reflected at the surface of the light reflecting layer 12, passes through the light transmitting layer 11 again and is emitted from the surface of the information recording medium 3.

Thereby, the propagated light 14 scattered from the data mark 4, follows an optical path having a distance of at least twice as much as the thickness of the light transmitting layer 11 right below the data mark 4 and an amount of the propagated light 14 emitted from the surface of the information recording medium 3 can be increased. Further, according to the planer probe 1, the side arranged with the light receiving element 6 is utilized by being inclined such that the clearance between the planer probe 1 and the surface of the information recording medium 3 becomes sufficiently large and accordingly, on the side of the light receiving element 6, the propagated light 14 which has followed the optical path which is increased by the clearance, is received and a reproduced signal having large intensity can be outputted. Therefore, in this case, a large amount of the propagated light 14 can be detected without enlarging the thickness of the light transmitting layer 11.

As has been explained above, according to the information reproducing apparatus according to Embodiment 5, the propagated light 14 provided by the information recording medium 3 comprising the two layer structure of the light transmitting layer 11 and the light reflecting layer 12, is received at the light receiving element 6 of the planer probe 1 arranged to be inclined such that the clearance between the planer probe 1 and the surface of the information recording medium 3 becomes sufficiently large, the reproduced signal having sufficiently large intensity indicating presence or absence of the data mark 4, can be provided and therefore, there is utilized downsized formation of the apparatus in the case of adopting the above-described transmission mode, further, stable reproduction of information having high reliability can be carried out by the reproduced signal having sufficiently large intensity.

(Embodiment 6)

Next, an explanation will be given of an information reproducing apparatus according to Embodiment 6. According to the information reproducing apparatus according to Embodiment 6, in the information reproducing apparatus according to Embodiments 1 through 5, described above, the constitution of the planer probe 1 is changed. Other apparatus constitution is similar to that in FIG. 1 and accordingly, an explanation thereof will be omitted here.

Figure 7:
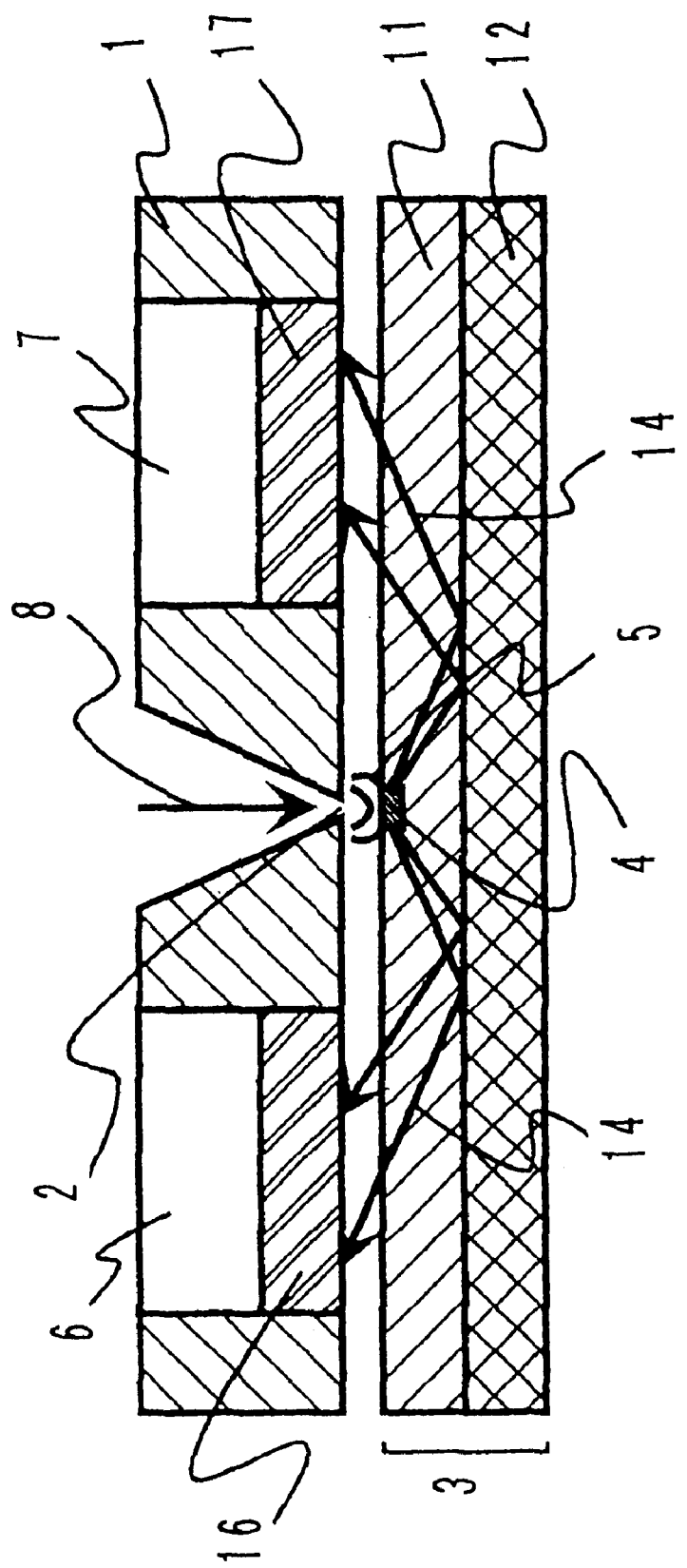
FIG. 7 is a view for explaining in details, a planer probe and an information recording-medium of an information reproducing apparatus according to Embodiment 6 of the invention.

FIG. 7 is a view for explaining in details, the planer probe 1 and the information recording medium 3 of the information reproducing apparatus according to Embodiment 6. In FIG. 7, according to the planer probe 1, the light receiving elements 6 and 7 are arranged on an upper face side of the planer substrate for receiving the propagated light 14 and the respective light receiving elements receive the propagated light 14 introduced from the lower face of the planer substrate via optical wave guide paths 16 and 17 provided to connect to lower portions thereof. By arranging the light receiving elements 6 and 7 at the upper face of the planer substrate constituting a base member of the planer probe 1, connection of electric wirings for taking out reproduced signals outputted from the respective light receiving elements can be facilitated.

Further, although in FIG. 7, as the information recording medium, there is shown the information recording medium 3 according to Embodiment 1, there can be used the information recording media 23, 33 and 43 explained in Embodiments 2 through 4.

As has been explained above, according to the information reproducing apparatus according to Embodiment 6, in the planer probe 1, the light receiving elements 6 and 7 are arranged at the upper face of the planer substrate, the optical wave guide paths 16 and 17 are provided to connect to the lower portions of the respective light receiving elements and accordingly, in addition to effects in the information reproducing apparatus according to Embodiment 1 through 5, connection of electric wirings for taking out reproduced signals outputted from the respective light receiving elements can be facilitated.

(Embodiment 7)

Next, an explanation will be given of an information reproducing apparatus according to Embodiment 7. According to the information reproducing apparatus according to Embodiment 7, in the information reproducing apparatus according to Embodiment 1 through 4, described above, the constitution adopting the illumination mode of introducing the laser beam 8 toward the very small aperture 2 of the planer probe 1 and generating the near-field light 5 at the very small aperture 2, is changed to a constitution of adopting a collection mode of irradiating the laser beam toward the data mark 4 and generating the near-field light 5 on the data mark 4.

Figure 8:
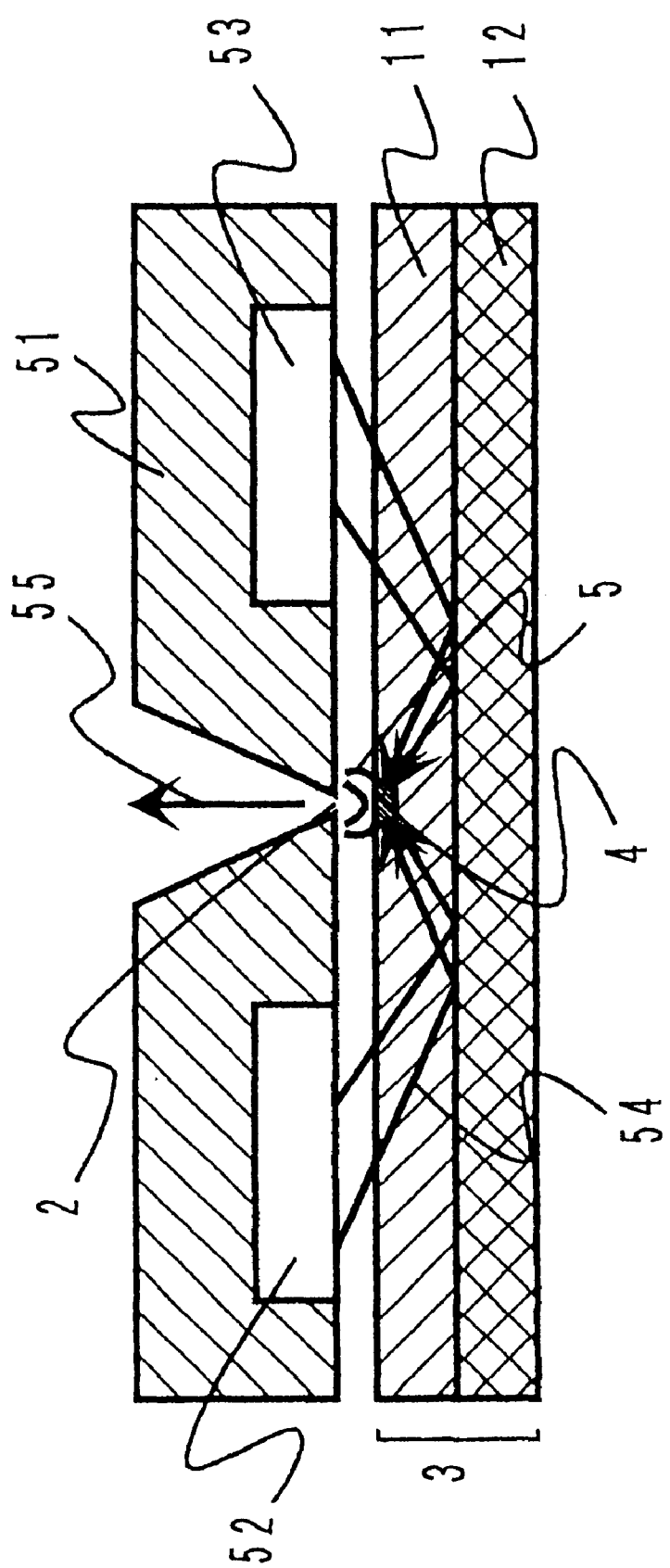
FIG. 8 is a view for explaining in details, a planer probe and an information recording medium of an information reproducing apparatus according to Embodiment 7 of the invention.

FIG. 8 is a view for explaining in details, a planer probe 51 and the information recording medium 3 of the information reproducing apparatus according to Embodiment 7. In FIG. 8, the planer probe 51 is provided with light emitting elements 52 and 53 for irradiating laser beam 54 symmetrically with respect to the very small aperture 2.

A significant characteristic of the information reproducing apparatus according to Embodiment 7 resides in that by adopting the information recording medium 3 comprising the two layer structure of the light transmitting layer 11 and the light reflecting layer 12, as shown by FIG. 8, generation of the near-field light 5 on the data mark 4 is achieved by irradiating the laser beam 54 from the light emitting elements 52 and 53 toward the light reflecting layer 12 without directly irradiating the laser beam 54 to the data mark 4. That is, according to the information reproducing apparatus according to Embodiment 7, reproduction of information by the collection mode and the transmission mode can be carried out.

Figure 9:
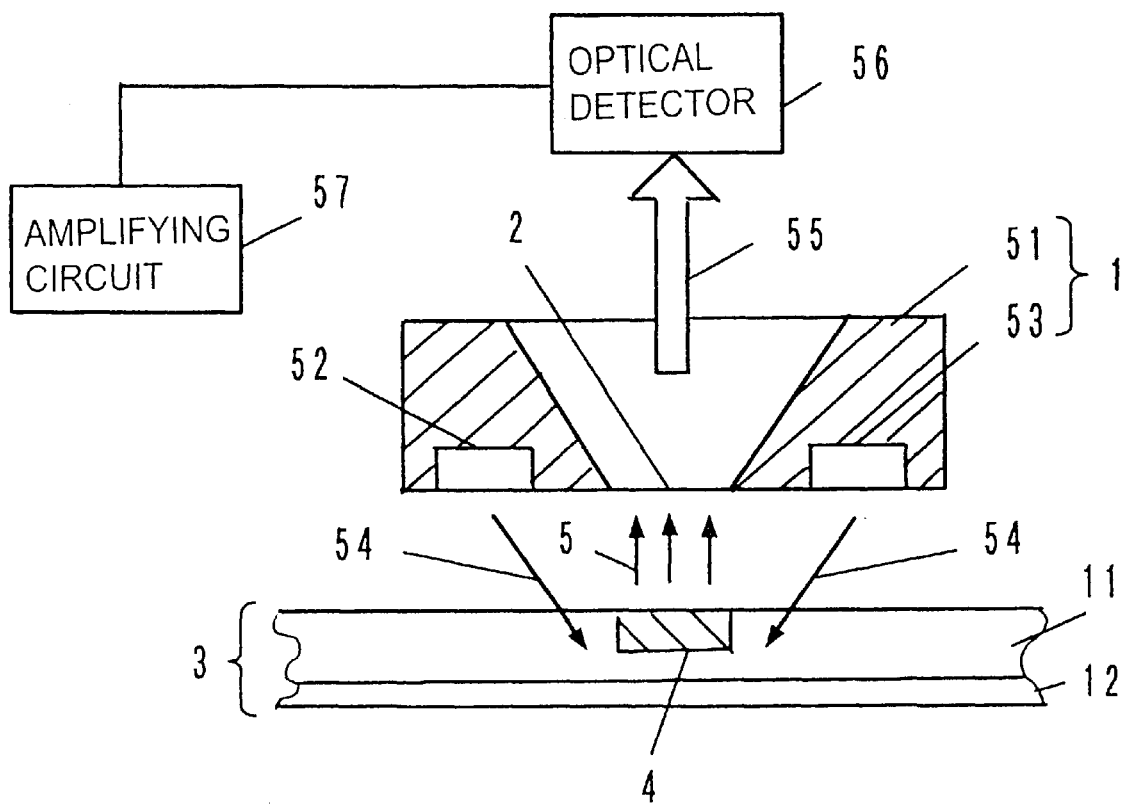
FIG. 9 is a block diagram showing an outline constitution of the information reproducing apparatus according to Embodiment 7 of the invention.

FIG. 9 is a block diagram showing an outline constitution of the information reproducing apparatus according to Embodiment 7. In FIG. 9, the information reproducing apparatus according to Embodiment 7, is provided with the above-described planer probe 51, the above-described information recording medium 3, an optical detector 56 for detecting propagated light derived at the planer probe 51 and an amplifying circuit 57 for amplifying an electric signal outputted from the optical detector 56 and outputting the signal as a reproduced signal.

According to the operation of the information reproducing apparatus according to Embodiment 7, firstly, the laser beam 54 is emitted from the light emitting elements 52 and 53 by an irradiation angle achieving irradiation of the laser beam 54 to the data mark 4 finally efficiently in consideration of reflection at the light reflecting layer 12. The laser beam 54 emitted from the light emitting elements 52 and 53 is introduced to the light transmitting layer 11, reflected at the surface of the light reflecting layer 12, specifically, the interface between the light transmitting layer 11 and the light reflecting layer 12 and reaches the rear face portion of the data mark 4 again via the transmitting layer 11. At the upper face of the data mark 4 irradiated with the laser beam 54, the near-field light 5 is generated and introduced as propagated light 55 by the very small aperture 2 of the planer probe 1. The propagated light 55 is received by the optical detector 56 and is converted into an electric signal. The optical detector 56 inputs the provided electric signal to the amplifying circuit 57 and at the amplifying circuit 57, the electric signal is amplified and outputted as a reproduced signal indicating presence or absence of the data mark 4.

Further, although in FIGS. 8 and 9, as the information recording medium, there is shown the information recording medium 3 according to Embodiment 1, the information recording media 23, 33 and 43 explained in Embodiments 2 through 4 can be used.

As explained above, according to the information reproducing apparatus according to Embodiment 7, by providing the light emitting elements 52 and 53 at the planer probe 1 and irradiating the laser beam 54 to the information recording medium 3 comprising the two layer structure of the light transmitting layer 11 and the light reflecting layer 12, laser beam irradiation from the rear face of the data mark 4 can be achieved, the near-field light 5 can be generated on the data mark 4 and accordingly, there can be provided the information reproducing apparatus utilizing the near-field light as the collection mode and the transmission mode.

(Embodiment 8)

Next, an explanation will be given of an information reproducing apparatus according to Embodiment 8. Although in the case of the information reproducing apparatus according to Embodiment 7, in the information reproducing apparatus according to Embodiment 1 through 7, described above, as the reproducing probe, a planer probe is adopted, in place thereof, there can be utilized a probe used in a conventional near-field microscope. For example, there can be utilized an optical fiber probe comprising an optical fiber which is provided with a very small aperture at a front end thereof and a surface of which is coated with a metal, or a cantilever type optical probe having a very small aperture to which laser beam is introduced via an optical wave guide path, at a front end thereof.

Figure 10:
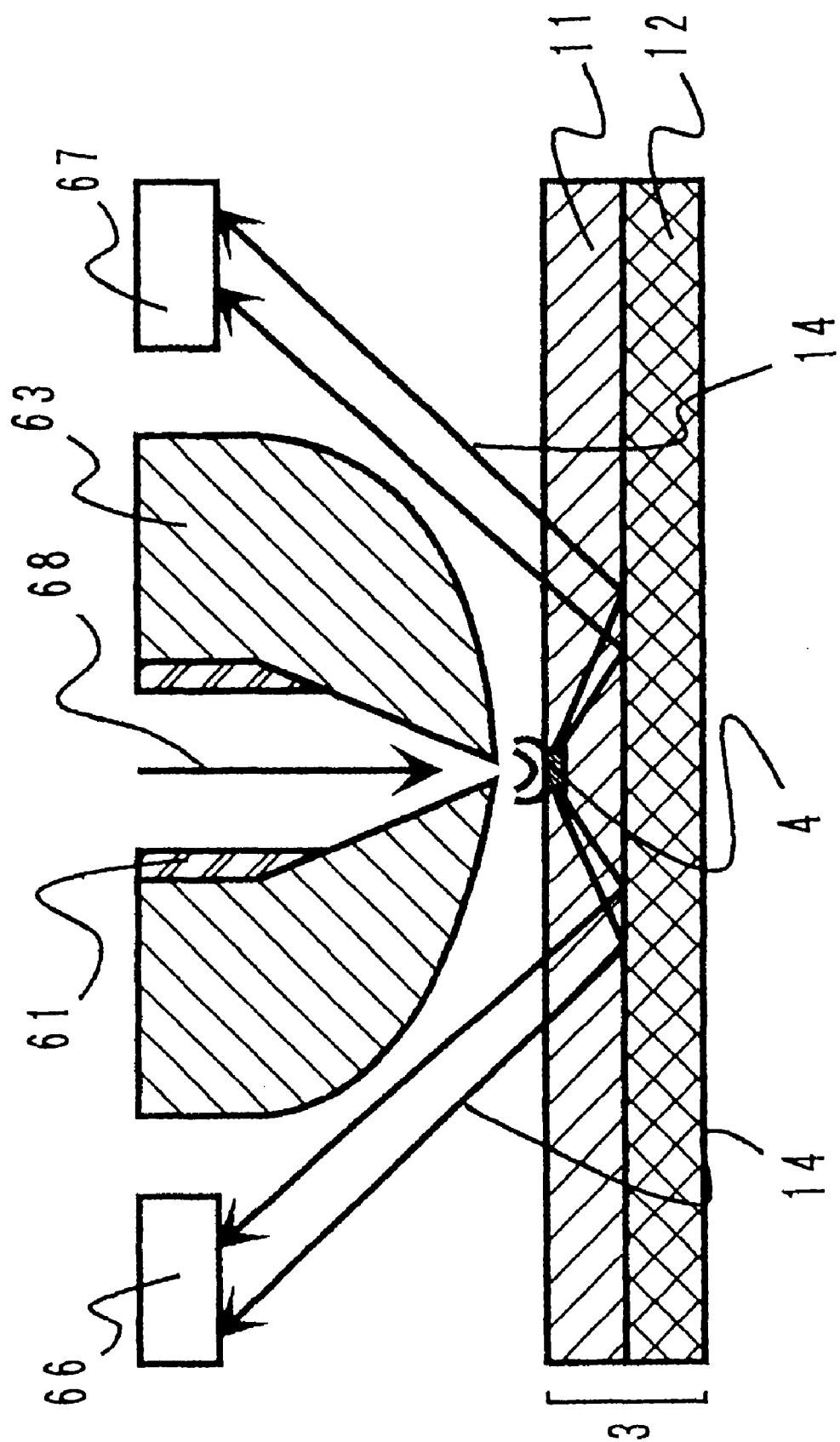
FIG. 10 is a view for explaining in details, a planer probe and an information recording medium of an information reproducing apparatus according to Embodiment 8 of the invention.

FIG. 10 is a view for explaining in details, an optical fiber probe 61 and the information recording medium 3 of the information reproducing apparatus in the case of adopting an optical fiber probe as a reproducing probe. In this case, there are arranged optical detectors 66 and 67 along with an optical lens system (not illustrated) at the vicinities of the optical fiber probe 61 and the propagated light 14 is detected by the optical detectors 66 and 67. Although the optical fiber probe 61 is generally coated with a light shielding film 63 for reducing transmission loss of laser beam 68, by presence of the light shielding film 63, the propagated light 14 generated at the vicinity of the very small aperture 72 cannot be provided sufficiently and with regard to a conventional information recording medium, a sufficient amount of the propagated light 14 cannot be generated at the data mark 4 thereby. That is, the optical fiber probe 61 also poses a problem similar to that in the case of adopting the planer probe as a reproducing probe.

However, by adopting the information recording medium 3 according to the invention as the information recording medium, as has been explained in Embodiment 1, the propagated light 14 can be increased as a result and reproduced signals having large intensities can be outputted at the optical detectors 66 and 67.

Figure 11:
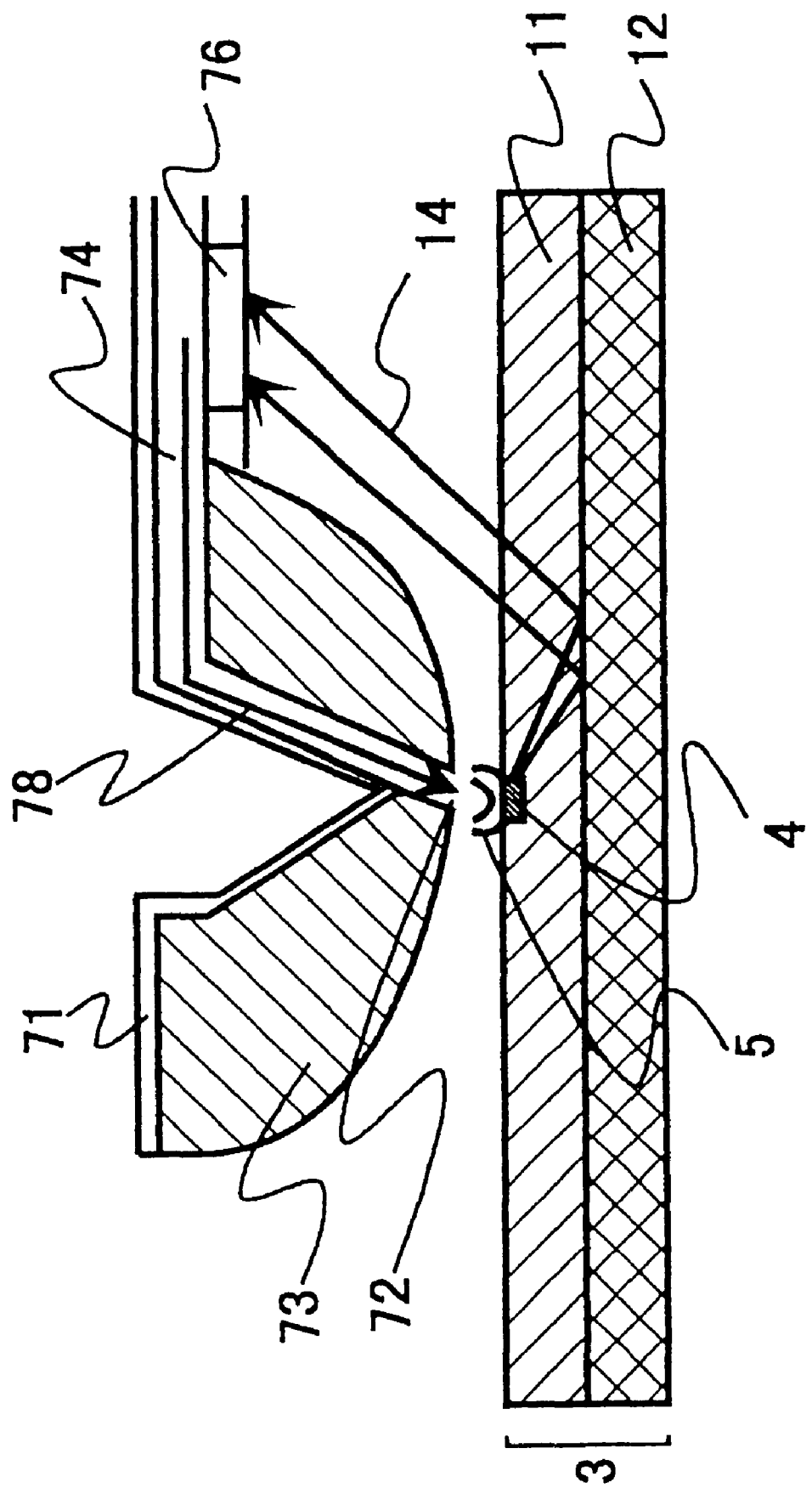
FIG. 11 is a view for explaining in details, a planer probe and an information recording medium of other example of the information reproducing apparatus according to Embodiment 8 of the invention.

FIG. 11 is a view for explaining in details, a cantilever type optical probe 71 and the information recording medium 3 of an information reproducing apparatus in the case of adopting the cantilever type optical probe as a reproducing probe. In this case, an optical detector 76 is provided at a lower face of a lever portion of the optical probe 71 of the cantilever type and the propagated light 14 is detected by the optical detector 76. The cantilever type optical probe 71 is provided with an optical wave guide path 74 introduced to a very small aperture 72 at an inner portion thereof and laser beam 78 is introduced to the very small aperture 72 via the optical wave guide path 74. Further, similar to the above-described optical probe 61, the cantilever type optical probe 71 is coated with a light shielding film 73 for reducing transmission loss of the laser beam 78, by presence of the light shielding film 73, the propagated light 14 generated at a vicinity of the very small aperture 72 cannot be provided sufficiently and with respect to a conventional information recording medium, a sufficient amount of the propagated light 14 cannot be generated at the data mark 4 thereby. That is, the cantilever type optical probe 71 also poses a problem similar to that in the case of adopting the planer probe as a reproducing probe.

However, also in this case, by adopting the information recording medium 3 according to the invention as the information recording medium, as has been explained in Embodiment 1, the propagated light 14 can be increased as a result and a reproduced signal having a large intensity can be outputted at the optical detector 76.

Further, although in FIGS. 10 and 11, as the information recording medium, there is shown the information recording medium 3 according to Embodiment 1, the information recording media 23, 33 and 43 explained in Embodiments 2 through 4 can be used.

As has been explained above, according to the information reproducing apparatus according to Embodiment 8, effects similar to those in Embodiments 1 through 4 can be achieved also in the case of adopting the optical fiber probe 61 or the cantilever type optical probe 71 as the reproducing probe.

Further, although in FIGS. 10 and 11, the optical fiber probe 61 or the cantilever type optical probe 71 is respectively shown to carry out the illumination mode, the collection mode is also applicable as explained in Embodiment 7.

(Embodiment 9)

Next, an explanation will be given of an information reproducing apparatus according to Embodiment 9. According to the information reproducing apparatus according to Embodiment 9, in the information reproducing apparatus according to Embodiment 3 and 4, described above, tracking control can further be carried out.

Figure 12:
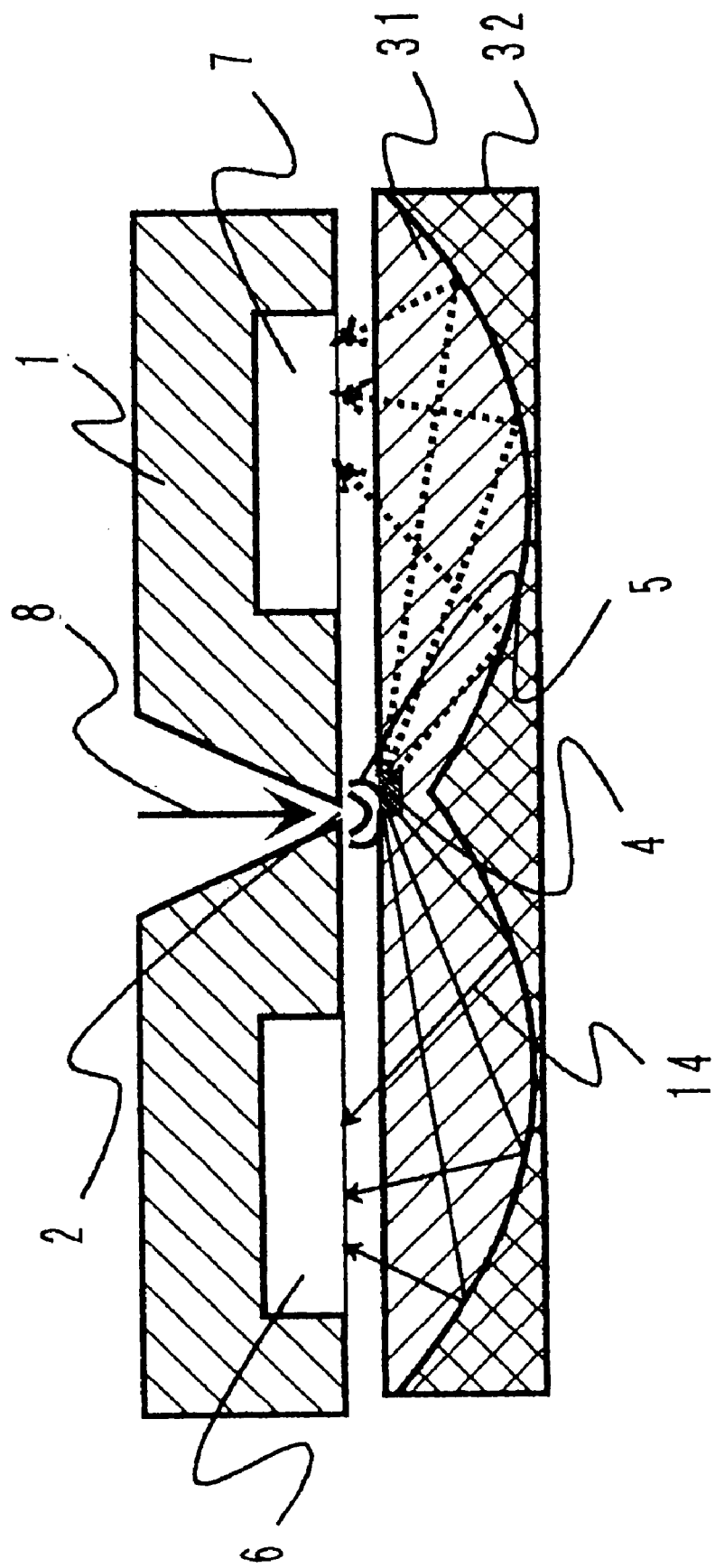
FIG. 12 is a view for explaining in details, a planer probe and an information recording medium of an information reproducing apparatus according to Embodiment 9 of the invention.

FIG. 12 a view for explaining in details, the planer probe 1 and an information recording media 33 of the information reproducing apparatus according to Embodiment 9. In FIG. 9, the planer probe 1 is similar to that explained in Embodiment 1 and there are provided the light receiving elements 6 and 7 for receiving the propagated light 14 symmetrically with respect to the very small aperture 2.

Further, as explained in Embodiment 3, the information recording medium 33 is formed with a light reflecting layer 32 for specifying reflecting positions of the propagated light 14. Therefore, the light receiving elements 6 and 7 are previously provided at positions equalizing both light receiving amounts (generated electric signals) of the propagated light 14 when the very small aperture 2 is arranged at a position at which a central axis of the very small aperture 2 along a reading track and a central axis of the data mark 4 coincide with each other. Further, the reading track in this case is a direction of arranging the data mark 4 for dealing with data as continuous significant information in the information recording medium 3.

Therefore, as shown by FIG. 12, when the very small aperture 2 is arranged at a position at which the central axis along the reading track and the central axis of the data mark 4 are deviated from each other, there is produced a difference between electric signals generated at the light receiving elements 6 and 7. It is the characteristic of the information reproducing apparatus according to Embodiment 9 to control to position the planer probe 1 based on a difference signal caused by the difference.

Figure 13:
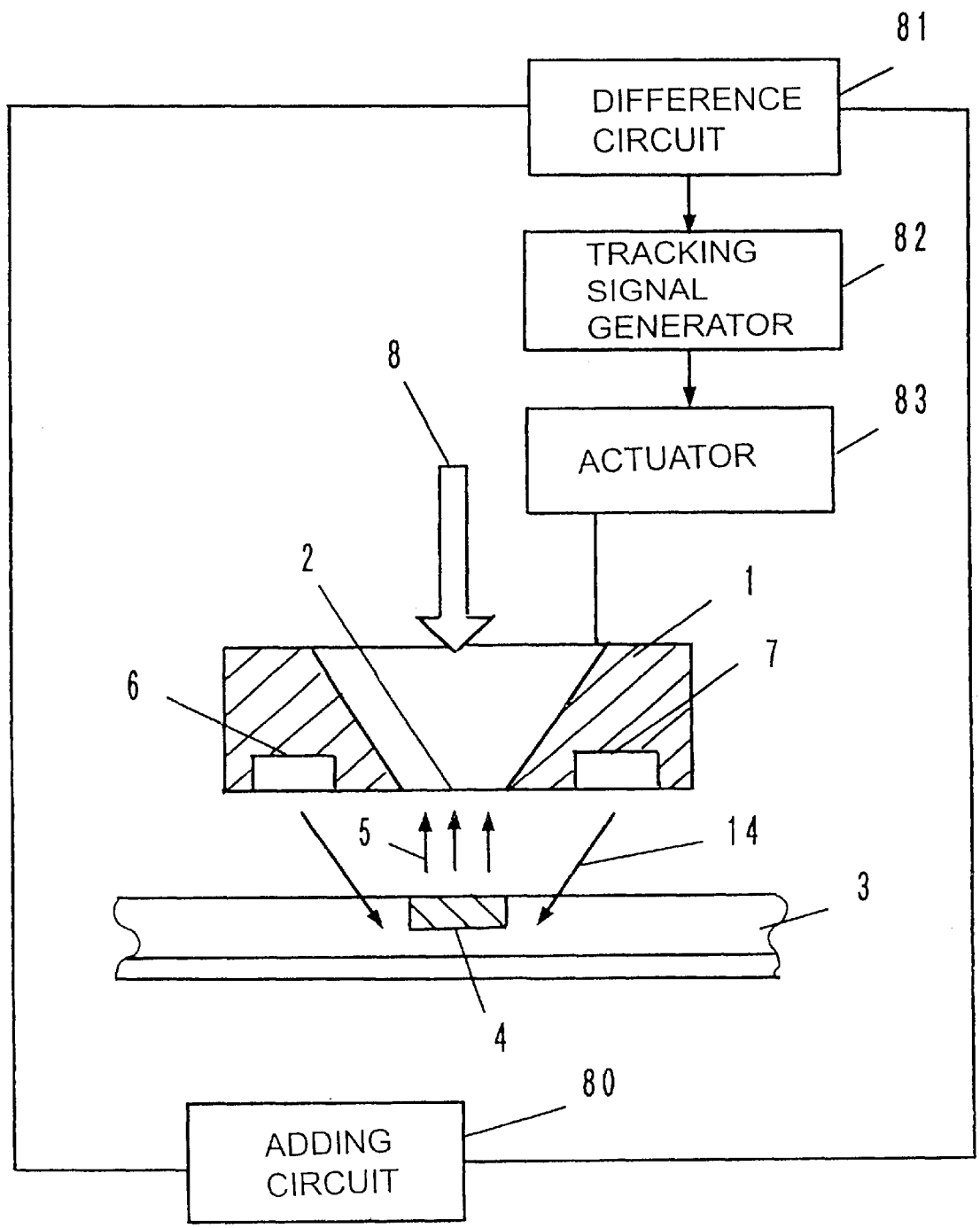
FIG. 13 is a block diagram showing an outline constitution of the information reproducing apparatus according to Embodiment 9 of the invention.
Figure 14:
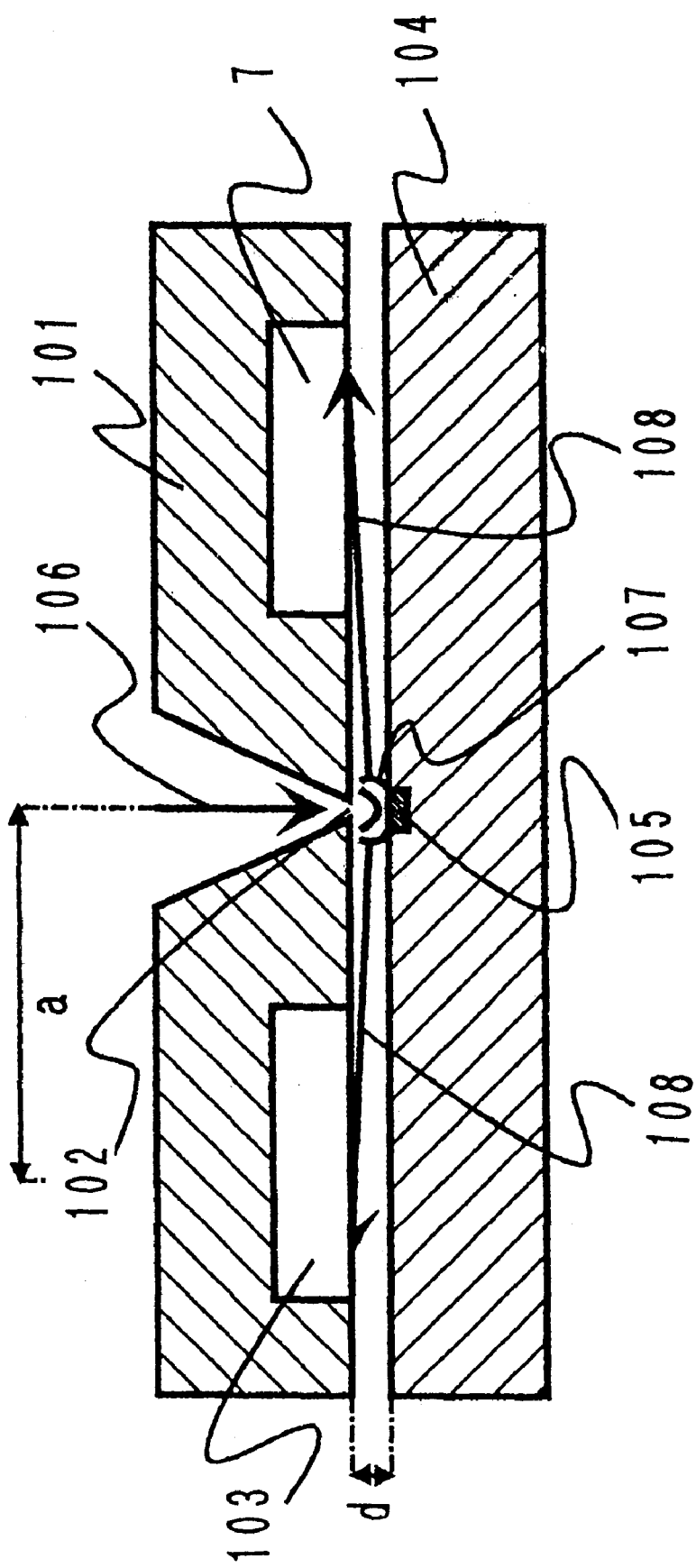
FIG. 14 is a view showing a planer probe and an information recording medium of a conventional art utilizing near-field light.

FIG. 13 is a block diagram showing an outline constitution of an information reproducing apparatus according to Embodiment 9. In FIG. 13, the information reproducing apparatus according to Embodiment 9, is provided with the above-described planer probe 1 for generating near-field light, the above-described information recording medium 3, the light receiving elements 6 and 7 for outputting electric signals by receiving the propagated light 14 scattered by the data mark 4 of the information recording medium 3, a difference circuit 81 for outputting a difference signal by calculating a difference between the respective electric signals outputted from the light receiving elements 6 and 7, a tracking signal generator 82 for generating and outputting a tracking signal from the difference signal outputted from the difference circuit 81, an actuator 83 for controlling a position of the reproducing probe in accordance with the tracking signal outputted from the tracking signal generator 82 and an adding circuit 80 for generating a reproduced signal by adding the respective electric signals outputted from the light receiving elements 6 and 7.

First, as shown by FIG. 12, when the central axis of the very small aperture 2 in parallel with the reading track is disposed to deviate in the left direction relative to the reading track of the information recording medium 3, the near-field light 5 is scattered further strongly on the right side of the data mark 4 and the propagated light 14 generated thereby is also incident strongly on the recess portion on the left side of the light reflecting layer 12. That is, the electric signal outputted at the light receiving element 6 indicates a signal larger than the electric signal outputted at the light receiving element 7.

As described above, the electric signals are inputted to the difference circuit 81 and the difference signal is generated there. The magnitude of the difference signal indicates a degree of deviation between the planer probe 1 and the reading track and the difference signal is converted into a tracking signal by being inputted to the tracking signal generator 82. The tracking signal is a signal for driving the actuator 83 and the actuator 83 controls the position of the planer probe 1 in accordance with the tracking signal. For example, in the difference circuit 81, when there is carried out operation of subtracting the electric signal outputted from the light receiving element 7 from the electric signal outputted from the light receiving element 6, in the state shown by FIG. 12, the difference signal outputted from the difference circuit 81 indicates a positive value.

Successively, at the tracking signal generator 82, the positive difference signal is interpreted as a signal for moving the actuator 83 to the right and the tracking signal indicating a movement direction thereof and a movement amount in accordance with the magnitude of the difference signal is outputted to the actuator 83. That is, the tracking signal generator 82 generates an actuator drive signal for correcting the deviation between the planer probe 1 and the reading track. The actuator 83 moves the planer probe 1 in accordance with the tracking signal outputted from the tracking signal generator 82 and makes the central axis of the very small aperture 2 of the planer probe 1 coincide with the reading track. That is, the tracking control is carried out to the right direction.

Further, although in FIG. 12, there is shown the case in which the planer probe 1 is disposed in the left direction relative to the reading track (central axis of the data mark 4), when the planer probe 1 is disposed to deviate in the right direction relative to the reading track, operation reverse to the above-described is carried out. That is, in this case, the tracking control is carried out in the left direction.

Further, in parallel with the above-described tracking processing, the electric signal outputted at the light receiving element 6 and the electric signal outputted at the light receiving element 7, are inputted to the adding circuit 80, subjected to the adding operation and outputted as the reproduced signal. Thereby, there is detected presence or absence of the data mark 4 right below the very small aperture 2.

As has been explained above, according to the information reproducing apparatus according to Embodiment 9, the propagated light 14 provided from the data mark 4 of the above-described information recording medium 3 can be detected in two directions symmetrical with respect to the very small aperture 2 of the planer probe 1 and the tracking control of the planer probe 1 can be carried out from the difference of the two detected electric signals. Further, the near-field light generated at the very small aperture of the planer probe 1 is utilized as the signal for the tracking control and accordingly, there is achieved the tracking control having high accuracy with high positional resolution.

Further, although in FIG. 12, as the information recording medium, there is shown the information recording medium 33 explained in Embodiment 3, similar operation and effect can be achieved also by using the information recording medium 43 explained in Embodiment 4. Further, in place of the planer probe 1, the planer probe 1 shown in Embodiment 6 and the optical fiber probe 61 or the cantilever type optical probe 71 shown in Embodiment 8 can also be used.

(Embodiment 10)

Figure 15:
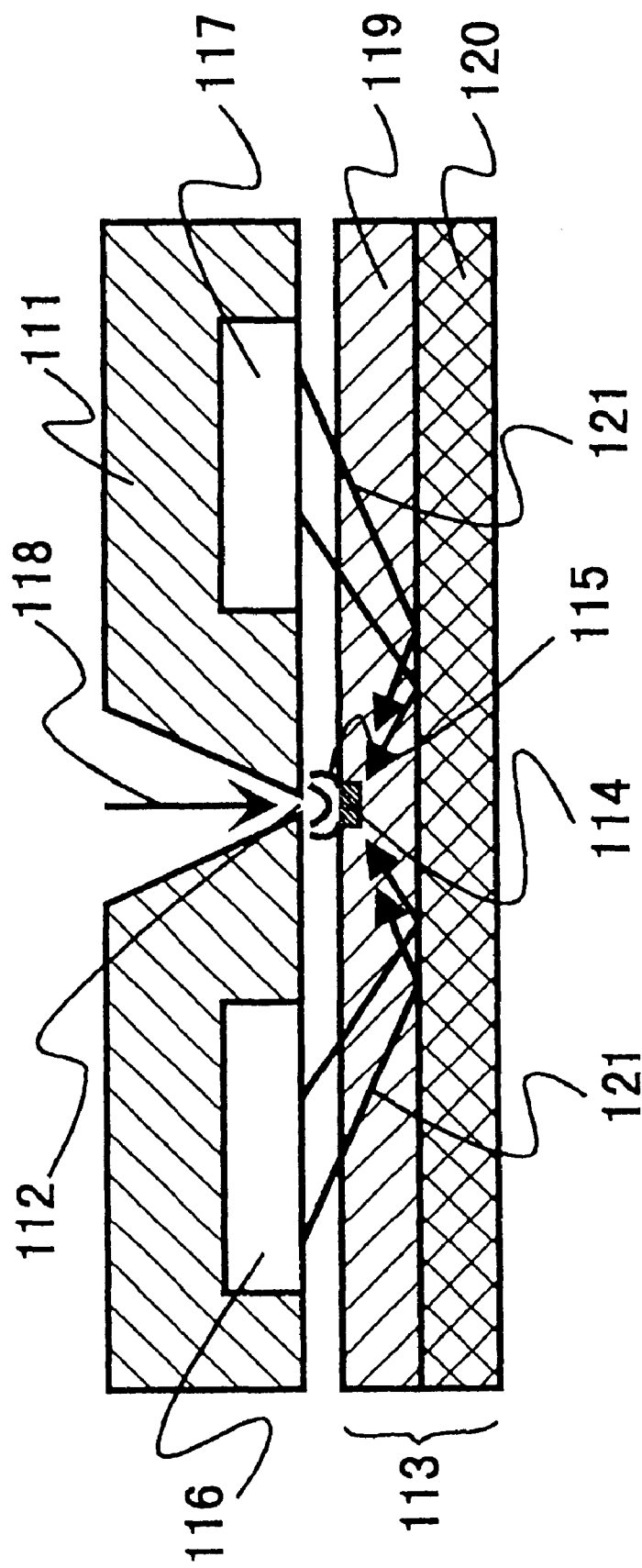
FIG. 15 is an enlarged view showing a head portion of an information recording and reproducing apparatus according to Embodiment 10 of the invention.

FIG. 15 shows an enlarged view of a head portion of an information recording and reproducing apparatus according to Embodiment 10. Although a structure thereof is similar to that in the planer probe and the information recording medium shown in FIG. 2, a difference therebetween resides in that light emitting elements 116 and 117 are used in place of the light receiving elements 6 and 7 and that propagation directions of the propagated light 121 are reversed. A planer probe 111 is formed with a very small aperture 112 having a size equal to or smaller than a wavelength of laser beam 118 introduced from a laser light source, not illustrated, for example, a diameter of several tens nanometers and near-field light 115 is generated at the very small aperture 112 by introducing the laser beam 118.

An information recording medium 113 is constructed by a two layer structure of a light transmitting layer 119 comprising a light transmitting member and a light reflecting layer 120 comprising a light reflecting member and a data mark 114 is formed on the light transmitting layer 119.

The propagated light 121 generated from the light emitting elements 116 and 117 transmits through the light transmitting layer 119, reflected by the surface of the light reflecting layer 120 and is irradiated to the data mark 114. The data mark is constituted by a phase change material a crystal state of which is changed by being provided with energy. Output levels of the light emitting elements 116 and 117 are set such that the propagated light 121 provides energy at a level which is slightly smaller than a threshold of energy necessary for changing the crystal state. Under the state, by irradiating the near-field light from the very small aperture 112 to the data mark, the data mark receives energy exceeding the above-described threshold. Thereby, the crystal state is changed and recording of information is realized.

The characteristic of the embodiment resides in that assist light for assisting near-field light for providing energy necessary for recording information, is provided with a sufficient propagation space by the presence of the light transmitting layer 119. Although the lower face of the planer probe 111 and the surface of the information recording medium 113 are extremely proximate to each other and propagated light is difficult to invade therebetween, by presence of the light transmitting layer 119, assist light having a sufficient intensity can reach the data mark.

As has been explained above, according to the information recording and reproducing apparatus according to Embodiment 10, the data mark is previously irradiated with the assist light having sufficient intensity and accordingly, even by irradiating very weak near-field light in a short period of time, the change in the crystal state of the surface of the information recording medium is caused and information can be recorded at high speed.

Industrial Applicability

As has been explained above, according to the invention, the first information recording medium comprises the two layer structure of the light transmitting layer comprising the light transmitting member and the light reflecting layer comprising the light reflecting member and the data mark is formed above the light reflecting layer and accordingly, there is achieved an effect that the propagated light generated by the interaction between the near-field light and the data mark can be reflected by the light reflecting layer via the light transmitting layer and can be emitted from the surface of the information recording medium and a sufficiently large amount of the propagated light can be provided at the surface of the information recording medium at a position remote from the data mark.

Further, according to the invention, the second information recording medium comprises the two layer structure of the light transmitting layer comprising the light transmitting member and the light reflecting layer comprising the light reflecting member, the interface between the light transmitting layer and the light reflecting layer is inclined in one direction, the data mark is formed on the light transmitting layer and accordingly, there is achieved an effect that the propagated light generated by the interaction between the near-field light and the data mark can be strongly reflected in the one direction at the light reflecting layer via the light transmitting layer and can be emitted from the surface of the light recording medium and a sufficient amount of the propagated light can be provided at the surface of the information recording medium at a position remote from the data mark on the side of the inclined face of the light reflecting layer 1.

Further, according to the invention, the third information recording medium comprises the two layer structure of the light transmitting layer comprising the light transmitting member and the light reflecting layer comprising the light reflecting member, the surface of light reflecting layer is formed in the shape achieving reflection of light to the specific area, the data mark 4 is formed on the light transmitting layer and accordingly, there is achieved an effect that the propagated light generated by the interaction between the near-field light and the data mark, can pass the light transmitting layer, can be strongly reflected to the specific area at the light reflecting layer, can be emitted from the surface of the information recording medium and a sufficient amount of the propagated light can be provided at the specific area at a position remote from the data mark.

Further, according to the invention, the fourth information recording medium comprises the two layer structure of the light transmitting layer comprising the light transmitting member and the light reflecting layer comprising the light reflecting member, the diffraction grating is formed at the surface of the light reflecting layer, the data mark is formed on the light transmitting layer and accordingly, there is achieved an effect that the propagated light generated by the interaction of the near-field light and the data mark can pass through the light transmitting layer, can be strongly reflected to the specific area determined by the diffraction grating at the light reflecting layer and can be emitted from the surface of the information recording medium and a sufficient amount of the propagated light can be provided at the specific area at a position remote from the data mark.

Further, according to the first information reproducing apparatus according to the invention, there is used the information recording medium comprising the two layer structure of the light transmitting layer comprising the light transmitting member and the light reflecting layer comprising the light reflecting member and formed with the data mark on the light reflecting layer, the propagated light provided by the information recording medium is received by the light detecting means, a reproduced signal having sufficiently large intensity indicating presence or absence of the data mark can be provided and accordingly, there is achieved an effect that there can be realized downsized formation of the apparatus in the case of adopting the illumination mode and a transmission mode constituting a system of information reproduction utilizing near-field light and there can be reproduced stable information having high reliability by the reproduced signal having the sufficiently large intensity.

Further, according to the second information reproducing apparatus according to the invention, there is used the information recording medium comprising the two layer structure of the light transmitting layer comprising the light transmitting member and the light reflecting layer comprising the light reflecting member and formed with the data mark above the light reflecting layer, the propagated light provided by the information recording medium is received by the light detecting means, a reproduced signal having a sufficiently large intensity indicating presence or absence of the data mark can be provided and accordingly, there is achieved an effect that there can be realized downsized formation of the apparatus in the case of adopting the collection mode and the transmission mode constituting the system of information reproduction utilizing near-field light and there can be reproduced stable information having high reliability by the reproduced signal having the sufficiently large intensity.

Further, according to the third information reproducing apparatus according to the invention, there is used the information recording medium comprising the two layer structure of the light transmitting layer comprising the light transmitting member and the light reflecting layer comprising the light reflecting member and formed with the data mark above the light reflecting layer, the propagated light provided by the information recording medium can be detected in two direction relative to the very small aperture of the reproducing probe and there can be carried out tracking control of the reproducing probe by the difference between the detected two detected signals. Further, the near-field light generated at the very small aperture of the reproducing probe is utilized as a signal for tracking control and therefore, there is achieved an effect that there can be carried out the tracking control having high accuracy with high positional resolution.

Further, according to the fourth information reproducing apparatus according to the invention, as the reproducing probe, there is adopted the planer probe provided with the light detecting means or the light irradiating means and accordingly, further compact apparatus constitution is achieved. Further, the planer probe can be fabricated by using the semiconductor fabrication technology and accordingly, there is achieved an effect that mass production having high reproducibility can be carried out.

Further, according to the fifth information reproducing apparatus according to the invention, the propagated light provided by the information recording medium comprising the two layer structure of the light transmitting layer and the light reflecting layer, is received by the light detecting means of the planer probe arranged to incline such that the clearance between the planer probe and the surface of the information recording medium becomes sufficiently large, there can be provided the reproduced signal having sufficiently large intensity indicating presence or absence of the data mark and accordingly, there is achieved an effect that there is realized downsized formation of the apparatus in the case of adopting the transmission mode constituting one of the systems of information reproduction utilizing near-field light, further, there can be reproduced stable information having high reliability by the reproduce signal having the sufficiently large intensity.

Further, according to the sixth information reproducing apparatus according to the invention, as the reproducing probe there can be utilized the probe of the optical fiber type used in a conventional near-field microscope and accordingly, there is achieved an effect that accumulated technology of the near-field microscope is effectively applicable to the information reproducing apparatus.

Further, according to the seventh information reproducing apparatus according to the invention, as the reproducing probe there can be utilized the probe of the cantilever type used in a conventional near-field microscope and accordingly, there is achieved an effect that accumulated technology of the near-field microscope is effectively applicable to the information reproducing apparatus.

Further, according to the first information recording and reproducing apparatus according to the invention, in an information recording and reproducing apparatus in which a recording and reproducing probe provided with a very small aperture for generating near-field light records and reproduces information to and from an information recording medium by carrying out an interaction between the recording and reproducing probe and the information recording medium via the near-field light wherein the information recording medium comprises a two layer structure of a light transmitting layer for transmitting light and a light reflecting layer for reflecting light and formed with a data mark constituting a unit of the information on the light transmitting layer, the information recording and reproducing apparatus comprising near-field light generating light irradiating means for irradiating irradiation light for generating the near-field light to the recording and reproducing probe, and propagated light irradiating means for irradiating light to the light reflecting layer such that the light is irradiated to an area at which the near-field light on the light transmitting layer carries out the interaction and accordingly, there is achieved an effect that the data mark can be irradiated not only by the near-field light from the probe but also by the light from the light reflecting layer and larger energy can be provided by the data mark.

Further, according to the second information recording and reproducing apparatus according to the invention in accordance with the first information recording and reproducing apparatus according to the invention, is characterized in that the light irradiated to the light reflecting layer is provided with an intensity and a wavelength for assisting the near-field light for recording the information and accordingly, there is achieved an effect that energy necessary for information recording can be provided not only by the near-field light from the probe but also by the assist light from the light reflecting layer and recording having high reliability at high speed can be realized by changing the state of the surface of the information recording medium by controlling the very weak near-field light.

Further, in the first and the second information recording and reproducing apparatus according to the invention, by carrying out the invention similar to any invention of the fourth through the seventh information reproducing apparatus according to the invention, in addition to inherent effects of the first and the second information recording and reproducing apparatus according to the invention, respective effects of the fourth through the seventh information reproducing apparatus according to the invention are realized.

What is claimed is:

1. An information recording medium comprising: a double-layer structure comprised of a light transmitting layer for transmitting light and a light reflecting layer for reflecting light, the light transmitting layer having a data mark which comprises a unit of information that is reproduced when light irradiated to the data mark generates propagation light that is reflected by the light reflecting layer at an interface between the light transmitting layer and the light reflecting layer.

2. An information recording medium according to claim 1; wherein the interface between the light transmitting layer and the light reflecting layer is inclined in one direction.

3. An information recording medium according to claim 1; wherein the light reflecting layer has a surface disposed at the interface between the light transmitting layer and the light reflecting layer for reflecting the propagation light.

4. An information recording medium according to claim 3; further comprising a diffraction grating disposed at the interface between the light transmitting layer and the light reflecting layer.

5. An information recording medium comprising: a double-layer structure comprised of a light transmitting layer for transmitting light and a light reflecting layer having a data mark which comprises a unit of information that is reproduced, the light reflecting layer underlying the light transmitting layer so that propagation light produced by an interaction between near-field light which interacts with the data mark travels an optical path by which it passes through the light transmitting layer, is reflected only once by the light reflecting layer, passes again through the light transmitting layer and emerges from the double-layer structure of the information recording medium.

6. An information recording medium according to claim 5; wherein a distance of the optical path traveled by the propagation light is twice or more than a thickness of the light transmitting layer.

7. An information recording medium according to claims 5; wherein the light reflecting layer has a surface disposed at an interface between the light transmitting layer and the light reflecting layer for reflecting the propagation light, the surface being inclined in one direction.

8. An information recording medium according to claim 5; wherein the light reflecting layer has a surface disposed at an interface between the light transmitting layer and the light reflecting layer for reflecting the propagation light, the surface having two recessed portions.

9. An information recording medium according to claim 8; wherein the two recessed portions are symmetrical about an axis passing through the data mark.

10. An information recording medium according to claim 5; further comprising a diffraction grating disposed at an interface between the light transmitting layer and the light reflecting layer for reflecting the propagation light.

11. An information reproducing apparatus comprising:
    an information recording medium comprised of a double-layer structure having a light transmitting layer for transmitting light and a light reflecting layer for reflecting light, the light transmitting layer having a data mark which comprises a unit of information that is reproduced by an interaction between near-field light and the data mark so that the data mark generates propagated light that is reflected by the light reflecting layer;
    a probe for generating the near-field light at a fine aperture thereof; and
    light detecting means for detecting the propagated light generated by the interaction between the near-field light generated by the probe and the data mark of the light transmitting layer and reflected by the light transmitting layer for outputting a detection signal corresponding to the detected propagated light.

12. An information reproducing apparatus according to claim 11; wherein the light reflecting layer has a surface disposed at an interface between the light transmitting layer and the light reflecting layer for reflecting the propagation light, the surface being inclined in one direction.

13. An information reproducing apparatus according to claim 11; wherein the probe comprises a generally planar-shaped substrate having a hole in a shape of an inverse cone, an end of the hole having the fine aperture; and wherein the light detecting means is disposed on the substrate.

14. An information reproducing apparatus according to claim 13; wherein the probe is inclined relative to a surface of the information recording medium.

15. An information reproducing apparatus according to claim 11; wherein the probe comprises an optical fiber having the fine aperture at a front end thereof.

16. An information reproducing apparatus according to claim 11, wherein the probe comprises a cantilever-type probe having the fine aperture at a projected portion thereof.

17. An information reproducing apparatus comprising:
    an information recording medium comprised of a double-layer structure having a light transmitting layer for transmitting light and a light reflecting layer for reflecting light, the light transmitting layer having a data mark which comprises a unit of information that is reproduced by an interaction between near-field light and the data mark so that the data mark generates propagated light that is reflected by the light reflecting layer;
    a probe for generating the near-field light at a fine aperture thereof;
    first and second light detecting means disposed on opposite sides of the fine aperture of the probe for detecting the propagated light generated by the interaction between the near-field light generated by the probe and the data mark of the light transmitting layer and reflected by the light transmitting layer and for outputting first and second detecting signals, respectively, corresponding to the detected propagated light;
    difference calculating means for calculating a difference between the first detecting signal outputted from the first light detecting means and the second detecting signal outputted from the second light detecting means and for outputting a signal corresponding to the calculated difference between the first and second detecting signals;
    position controlling means for controlling a position of the probe in accordance with the signal outputted from the difference calculating means; and
    reproduced signal generating means for generating a reproduced signal by adding the first detection signal to the second detection signal.

18. An information reproducing apparatus according to claim 17; wherein the light reflecting layer has a surface disposed at an interface between the light transmitting layer and the light reflecting layer for reflecting the propagation light, the surface being inclined in one direction.

19. An information reproducing apparatus according to claim 17; wherein the probe comprises a generally planar-shaped substrate having a hole in a shape of an inverse cone, an end of the hole having the fine aperture; and wherein the first and second light detecting means are disposed on the substrate.

20. An information reproducing apparatus according to claim 19; wherein the probe is inclined relative to a surface of the information recording medium.

21. An information reproducing apparatus according to claim 17; wherein the probe comprises an optical fiber having the fine aperture at a front end thereof.

22. An information reproducing apparatus according to claim 17; wherein the probe comprises a cantilever-type probe having the fine aperture at a projected portion thereof.

23. An information recording and reproducing apparatus comprising:
    an information recording medium comprised of a double-layer structure having a light transmitting layer for transmitting light and a light reflecting layer for reflecting light, the light reflecting layer having a data mark which comprises a unit of information to be reproduced;
    a probe for generating near-field light at a fine aperture thereof and for recording information on and reproducing information from the information recording medium by an interaction between the near-field light and the data mark of the light reflecting layer;
    first light irradiating means for irradiating irradiation light to generate the near-field light at the fine aperture of the probe; and
    second light irradiating means for irradiating light to the light reflecting layer so that the light is irradiated to the data mark of the light reflecting layer.

24. An information recording and reproducing apparatus according to claim 23; wherein the light irradiated by the second light irradiating means comprises assist light having preselected intensity and wavelength for assisting the near-field light to record the information.

25. An information reproducing apparatus comprising: an information recording medium having a light transmitting layer for transmitting light and a light reflecting layer for reflecting light, the light transmitting layer having a data mark which comprises a unit of information that is reproduced by an interaction between near-field light and the data mark so that the data mark generates propagated light that is reflected by the light reflecting layer; a probe having a fine aperture; light irradiating means for irradiating light through the fine aperture of the probe to generate the near-field light which interacts with the data mark of the light transmitting layer of the information recording medium to thereby produce the propagation light which travels an optical path by which it passes through the light transmitting layer, is reflected by the light reflecting layer, passes again through the light transmitting layer and emerges from the information recording medium; and light detecting means for detecting the propagation light and for producing a reproduced signal corresponding to the unit of information represented by the data mark of the light transmitting layer.

26. An information reproducing apparatus according to claim 25; wherein a distance of the optical path traveled by the propagation light is twice or more than a thickness of the light transmitting layer of the information recording medium.

27. An information reproducing apparatus according to claim 25; wherein the light reflecting layer has a surface disposed at an interface between the light transmitting layer and the light reflecting layer for reflecting the propagation light, the surface being inclined in one direction.

28. An information recording and reproducing apparatus comprising: an information recording medium having a light transmitting layer for transmitting light and a light reflecting layer for reflecting light, the light transmitting layer having a data mark which comprises a unit of information that is reproduced by an interaction between near-field light and the data mark so that the data mark generates propagated light that is reflected by the light reflecting layer; a probe having a fine aperture; light irradiating means for irradiating light through the fine aperture of the probe to generate the near-field light which interacts with the data mark of the light transmitting layer of the information recording medium to thereby produce the propagation light; light detecting means for detecting the propagation light and for producing a reproduced signal corresponding to the unit of information represented by the data mark of the light transmitting layer; and means for directing the propagation light to the data mark of the light transmitting layer.

29. An information recording and reproducing apparatus according to claim 28; wherein the light reflecting layer has a surface disposed at an interface between the light transmitting layer and the light reflecting layer for reflecting the propagation light, the surface being inclined in one direction.

* * * * *